(12) United States Patent
Lee et al.

(10) Patent No.: US 12,684,227 B2
(45) Date of Patent: Jul. 14, 2026

(54) ELECTRONIC DEVICE FOR EDITING VIDEO USING OBJECTS OF INTEREST AND OPERATING METHOD THEREOF

(71) Applicant: Samsung Electronics Co., Ltd., Gyeonggi-do (KR)

(72) Inventors: Sanghun Lee, Gyeonggi-do (KR); Dasom Lee, Gyeonggi-do (KR); Kwangyong Lim, Gyeonggi-do (KR); Sungoh Kim, Gyeonggi-do (KR); Kyoungkeun Park, Gyeonggi-do (KR); Daiwoong Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/896,341

(22) Filed: Aug. 26, 2022

(65) Prior Publication Data

US 2022/0417446 A1      Dec. 29, 2022

Related U.S. Application Data

(63) Continuation of application No. PCT/KR2021/018548, filed on Dec. 8, 2021.

(30) Foreign Application Priority Data

Dec. 22, 2020      (KR) ........................ 10-2020-0181101

(51) Int. Cl.
*H04N 23/63* (2023.01)
*G06V 10/25* (2022.01)
(Continued)

(52) U.S. Cl.
CPC ........... *H04N 23/632* (2023.01); *G06V 10/25* (2022.01); *G06V 10/945* (2022.01); *G06V 20/41* (2022.01);
(Continued)

(58) Field of Classification Search
CPC ........ H04N 23/632; H04N 5/77; G06V 10/25; G06V 20/46; G06V 20/41; G06V 10/945; G11B 27/031
See application file for complete search history.

(56) References Cited

U.S. PATENT DOCUMENTS 10,277,858 B2      4/2019   Kankaanpääet al.
2015/0104149 A1      4/2015   Sim et al.
(Continued)

FOREIGN PATENT DOCUMENTS

JP            4923517       2/2012
KR      10-2014-0052744    5/2014
(Continued)

OTHER PUBLICATIONS

PCT/ISA/210 Search Report issued on PCT/KR2021/018548, Mar. 29, 2022, pp. 3.
(Continued)

*Primary Examiner* — Sunghyoun Park
(74) *Attorney, Agent, or Firm* — The Farrell Law Firm, P.C.

(57)                    ABSTRACT

A method and an electronic device are provided for editing video using objects of interest included in the video. An electronic device includes a camera, a memory, and a processor. The processor may obtain first video data through the camera, while obtaining the first video data, determine a first object of interest in a plurality of image frames included in the first video data, store, in the memory, second video data generated from the first video data based on the first object of interest, after generating the second video data, receive a user input for determining a second object of interest, different from the first object of interest, in the plurality of the image frames included in the first video data, and in response to receiving the user input, store, in the (Continued)

memory, third video data generated from the first video data based on at least the second object of interest.

20 Claims, 16 Drawing Sheets

(51) Int. Cl.

| | | |
|---|---|---|
| *G06V 10/94* | (2022.01) | |
| *G06V 20/40* | (2022.01) | |
| *G11B 27/031* | (2006.01) | |
| *H04N 5/77* | (2006.01) | |

(52) U.S. Cl.
CPC ............ *G06V 20/46* (2022.01); *G11B 27/031* (2013.01); *H04N 5/77* (2013.01)

(56) References Cited

U.S. PATENT DOCUMENTS

| | | | |
|---|---|---|---|
| 2016/0335499 A1 | 11/2016 | Tsai et al. | |
| 2016/0381320 A1* | 12/2016 | Mate ...................... | G11B 27/28 |
| | | | 348/441 |
| 2017/0339347 A1 | 11/2017 | Cho et al. | |
| 2018/0027186 A1 | 1/2018 | Jung et al. | |
| 2018/0341705 A1* | 11/2018 | Kim .................... | G06F 16/3341 |
| 2018/0373992 A1* | 12/2018 | Yin ........................ | G06N 3/008 |
| 2019/0037269 A1* | 1/2019 | Chen ............... | H04N 21/41407 |
| 2019/0180111 A1 | 6/2019 | Kim et al. | |
| 2020/0053293 A1* | 2/2020 | Lee ..................... | G06F 3/04845 |

FOREIGN PATENT DOCUMENTS

| | | |
|---|---|---|
| KR | 10-2015-0089598 | 8/2015 |
| KR | 1020170131101 | 11/2017 |
| KR | 10-2018-0003309 | 1/2018 |
| KR | 1020180010042 | 1/2018 |
| KR | 1020180027191 | 3/2018 |
| KR | 10-1853355 | 4/2018 |
| KR | 10-1938667 | 1/2019 |
| KR | 10-1967086 | 4/2019 |
| KR | 10-2147100 | 8/2020 |

OTHER PUBLICATIONS

PCT/ISA/237 Written Opinion issued on PCT/KR2021/018548, Mar. 29, 2022, pp. 4.

European Search Report dated Mar. 12, 2024 issued in counterpart application No. 21911329.7-1208, 11 pages.

Korean Office Action dated Feb. 26, 2026 issued in counterpart application No. 10-2020-0181101, 6 pages.

* cited by examiner

301

WHILE ACQUIRING FIRST VIDEO DATA,
OBTAIN KEY FRAME INFORMATION
CORRESPONDING TO IMAGE FRAME WHERE
AT LEAST ONE IS EXTRACTED IN
PRE-DESIGNATED MANNER AMONG
PLURALITY OF IMAGE FRAMES INCLUDED IN
THE FIRST VIDEO DATA                          ~501

STORE KEY FRAME INFORMATION TOGETHER
WITH FIRST VIDEO DATA IN MEMORY            ~503

END

FIRST OBJECT (601)

600a

SECOND OBJECT (602)

FIRST OBJECT (601)

600b

SECOND OBJECT (602)

FIRST OBJECT (601)

600c

KEY FRAME INDICATION (904)

OBJECT OF INTEREST (911)

REGION OF INTEREST (912)

PROGRESS BAR (903)

910

OBJECT OF INTEREST (921)

SIZE CONTROL HANDLE (905)

REGION OF INTEREST (922)

920

OBJECT OF INTEREST (911)

SIZE CONTROL HANDLE (905)

REGION OF INTEREST (912)

KEY FRAME INDICATION (906)

930

ELECTRONIC DEVICE FOR EDITING VIDEO USING OBJECTS OF INTEREST AND OPERATING METHOD THEREOF

CROSS-REFERENCE TO RELATED APPLICATIONS

This application is a Bypass Continuation Application of International Application No. PCT/2021/018548, which was filed on Dec. 8, 2021, and is based on and claims priority under 35 U.S.C. § 119 to Korean Patent Application No. 10-2020-0181101, filed in the Korean Intellectual Property Office on Dec. 22, 2020, the entire disclosure of each of which is incorporated by herein reference.

BACKGROUND

1. Field

The disclosure relates generally video editing, and more particularly, to a method and apparatus for editing video using objects of interest included in the video.

2. Description of the Related Art

As functions of an electronic device, e.g., a mobile device, diversify, the demand for improved photographing and/or video shooting functions using the mobile device are increasing. For example, a mobile device may perform various image capturing functions and image editing functions.

According to an auto framing technology, a mobile device may detect an object of interest, such as a person being filmed in a video, and acquire a digital zoom video based on a detection result. The mobile device may also obtain a digital zoom video by enlarging or reducing an image frame based on the object of interest in each image frame through the auto framing technology. Through the use of an auto framing technology, even if the mobile device is in a fixed position, it may obtain video generated based on the object of interest.

According to a conventional auto framing technology, an electronic device may obtain a digital zoom video based on an object of interest, which is different from a user's intended object while filming a video. If the electronic device obtains a video different from the user's intention, it may be difficult for the electronic device to obtain a digital zoom video based on the user's intended object by modifying the stored digital zoom video.

SUMMARY

The disclosure is provided to address at least the above-mentioned problems and/or disadvantages and to provide at least the advantages described below.

Accordingly, an aspect of the disclosure is to provide an apparatus and method in which, even after obtaining a digital zoom video based on an object of interest that is different from a user's intended object, an electronic device may generate a new digital zoom video based on the user's intended object.

Another aspect of the disclosure is to provide an apparatus and method that obtain a new digital zoom video without modifying an object of interest or a region of interest in each image frame.

In accordance with an aspect of the disclosure, an electronic device is provided, which includes a camera, a memory, and a processor. The processor is configured to obtain first video data through the camera, while obtaining the first video data, set a first object of interest in a plurality of image frames included in the first video data, store second video data generated based on the first object of interest from the first video data in the memory, after generating the second video data, receive a user input which sets a second object of interest different from the first object of interest in the plurality of the image frames included in the first video data, and in response to receiving the user input, store third video data generated based on at least the second object of interest from the first video data in the memory.

In accordance with another aspect of the disclosure, a method is provided for an electronic device. The method includes obtaining first video data through a camera included in the electronic device, while the obtaining first video data, setting a first object of interest in a plurality of image frames included in the first video data, storing second video data generated based on the first object of interest from the first video data in a memory included in the electronic device, after generating the second video data, receiving a user input which sets a second object of interest different from the first object of interest in the plurality of the image frames included in the first video data, and in response to receiving the user input, storing third video data generated based on at least the second object of interest from the first video data in the memory.

In accordance with another aspect of the disclosure, an electronic device is provided, which includes a camera, a memory, and a processor. The processor is configured to, using a first application, obtain first video data through the camera, sets a first object of interest in a plurality of image frames included in the first video data, and stores second video data generated based on the first object of interest from the first video data in the memory second, and using a second application, receive a user input which sets a second object of interest different from the first object of interest in the plurality of the image frames included in the first video data, and stores third video data generated based on at least the second object of interest from the first video data in the memory.

BRIEF DESCRIPTION OF DRAWINGS

The above and other aspects, features and advantages of certain embodiments of the disclosure will be more apparent from the following detailed description, taken in conjunction with the accompanying drawings, in which.

DETAILED DESCRIPTION

Hereinafter, embodiments of the disclosure will be described in detail with reference to accompanying drawings. Descriptions of well-known functions and constructions are omitted for the sake of clarity and conciseness.

Figure 1:
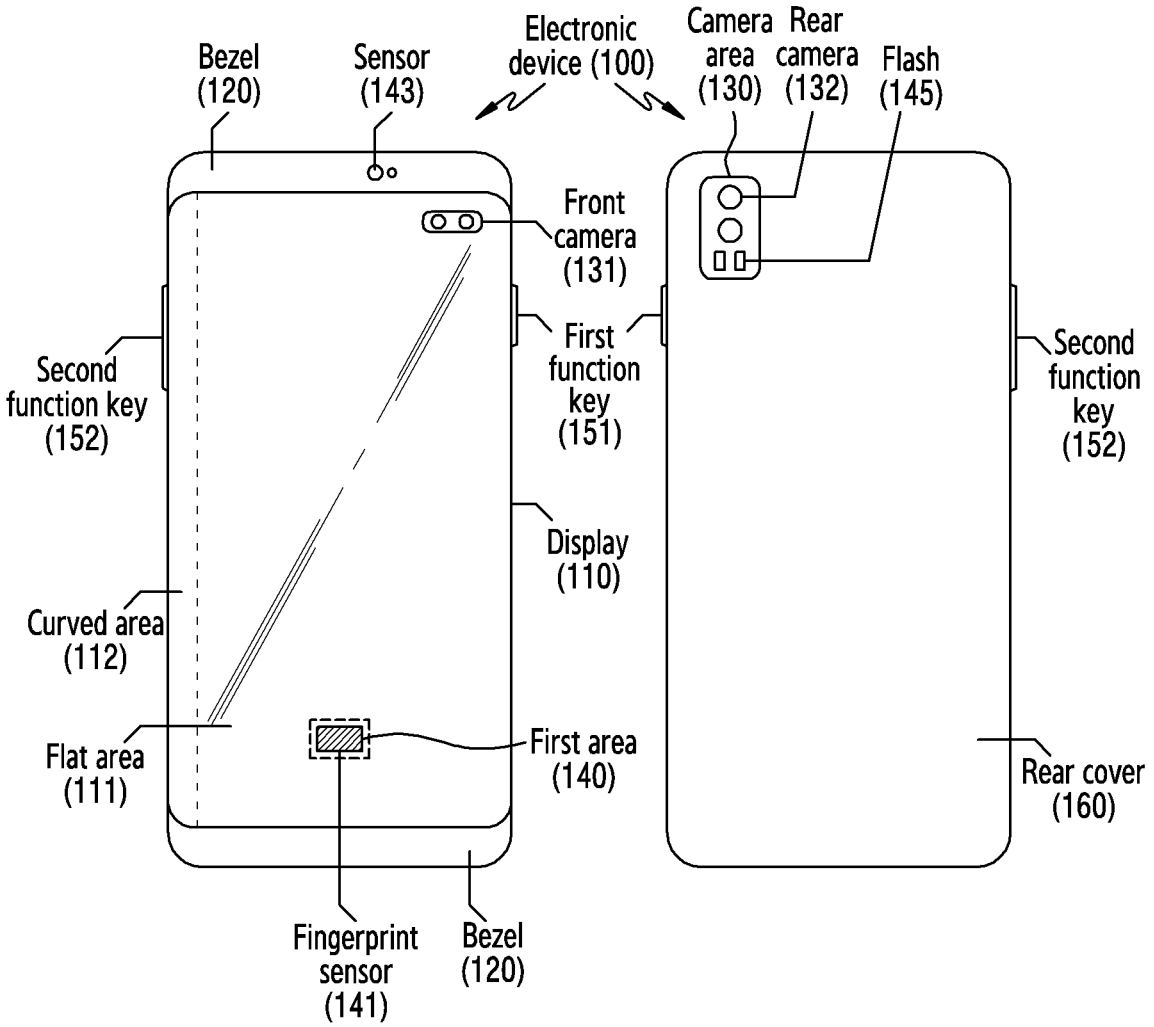
FIG. 1 illustrates an electronic device according to an embodiment.

FIG. 1 illustrates an electronic device according to an embodiment.

Referring to FIG. 1, a display 110 is provided in a front surface of an electronic device 100. The display 110 may occupy most of the front surface of the electronic device 100. The front surface of the electronic device 100 also includes a bezel area 120 surrounding at least some edges of the display 110.

In the example of FIG. 1, the display 110 includes a flat area 110 and a curved area 112 extending from the flat area 111 to a side surface of the electronic device 100. While the curved area 112 is illustrated on only one side (i.e., the left side) of the electronic device 100 in FIG. 1, a curved area may also be formed on the right side. Other variations are also possible. For example, the display 110 may include the flat area 111 without the curved area, or the curved area 112 may be extended to a rear surface of the electronic device 100, and the electronic device 100 may include an additional flat area.

A first area 140 of the display 110 includes a fingerprint sensor 141 for fingerprint recognition. The fingerprint sensor 141, which is disposed in a layer below the display 110, when viewing the display 110, may be disposed not to be viewed by a user or to be viewed hardly. In addition, a sensor for an additional user and/or biometric authentication may be disposed in another area of the display 110. The sensor for the user and/or the biometric authentication may be disposed in one area of the bezel 120. For example, an infrared (IR) sensor for iris authentication may be exposed through one area of the display 110, or may be exposed through one area of the bezel 120.

A sensor 143 is included in an area of the bezel 120. Alternatively, the sensor 14 may be included in an area of the display 110. The sensor 143 may be for distance detection and/or object detection. The sensor 143 may be disposed relatively close to a camera module (e.g., a front camera 131 or a rear camera 132) or may be formed as a single module with the camera module. The sensor 143 may operate as at least part of an IR camera (e.g., a time of flight (TOF) camera, a structured light camera, etc.) or may operate as at least part of a sensor module.

The front surface of the electronic device 100 includes the front camera 131. While FIG. 1 illustrates the front camera 131 being exposed through the display 110, alternatively, the front camera 131 may be exposed through the bezel 120.

The display 110 may include at least one or more of the sensor module, the camera module (e.g., the front camera 131 or the rear camera 132), and a light emitting device (e.g., a light emitting diode (LED)), on a rear surface of a screen display area (e.g., the flat area 111 and/or the curved area 112).

The camera module may be included behind at least one of the front surface, the side surface, and/or the rear surface of the electronic device 100. For example, the front camera 131 may not be visually exposed to the flat area 111, and may include a hidden under display camera (UDC).

The electronic device 100 may include one or more front cameras 131, e.g., a first front camera and a second front camera. The first front camera and the second front camera may be the same type of cameras or may be different types of cameras.

The electronic device 100 may support various functions related to a dual camera through the two front cameras (e.g., three dimensional (3D) filming, autofocus (AF), etc.).

The rear surface of the electronic device 100 includes the rear camera 132. The rear camera 132 may be exposed through a camera area 130 of a rear cover 160. The electronic device 100 may include a plurality of rear cameras disposed in the camera area 130, e.g., a first rear camera, a second rear camera, and a third rear camera. The first rear camera, the second rear camera, and the third rear camera may have different specifications. For example, the first rear camera and the second rear camera and/or the third rear camera may be different from each other in at least one of a field of view (FOV), pixels, an aperture, optical zoom/digital zoom support, optical image stabilization (OIS) support, a type and/or an arrangement of a lens set included in each camera. For example, the first rear camera may have a standard lens, the second rear camera may have a wide-angle lens, and the third rear camera may have a telephoto lens. Herein, descriptions on functions or characteristics of the front camera may also be applied to the rear camera, and vice versa.

The camera area 130 includes a flash 145, and may additionally include various hardware or sensors for assisting the photographing, such as a distance sensor for detecting a distance between a subject and the electronic device 100.

The distance sensor may be disposed relatively close to the camera module (e.g., the front camera 131 and/or the rear camera 132) or may be formed as a single module with the camera module. For example, the distance sensor may operate as at least part of the IR camera (e.g., a TOF camera, a structured light camera, etc.) or may operate as at least part of the sensor module. The TOF camera may operate as at least part of the sensor module for detecting the distance to the subject.

A first function key 151 is disposed on a side portion of the electronic device 100. The first function key 151 may be utilized for turning on/off the display 110 or turning on/off the electronic device 100.

A second function key 152 is provided on a left edge based on the front surface of the electronic device 100 may be utilized for controlling volume or screen brightness of the electronic device 100.

An additional button or key may be disposed on the front surface or the rear surface of the electronic device 100. For example, a physical button or a touch button mapped to a designated function may be disposed in a lower area of the bezel 120 of the front surface.

The electronic device 100 in FIG. 1 corresponds to one example, and does not limit the type of the device to which the technical ideas described in this disclosure are applied. The embodiments described in this disclosure may be applied to various user devices including a first camera module facing a first direction, and a second camera module facing a direction different from the first direction. The embodiments described in this disclosure may be applied to a foldable electronic device, a tablet, or a notebook. In addition, the embodiments described in this disclosure may be applied even if it is possible to arrange the first camera module and the second camera module facing the same direction to face different directions through rotation, folding, or deformation of the device. For example, the electronic device 100 is illustrated as a bar type or a plate type terminal, but the embodiments of this disclosure are not limited thereto. For example, an electronic device may be a part of a rollable electronic device, which allows bending deformation of the display 110 that may be wound or rolled in at least part, or accommodated into the electronic device 100. The rollable electronic device may expand and use the screen display area by unfolding the display 110 or exposing a wider area of the display 110 to outside, as controlled by the user. The display 110 may be a slide-out display or an expandable display.

Figure 2:
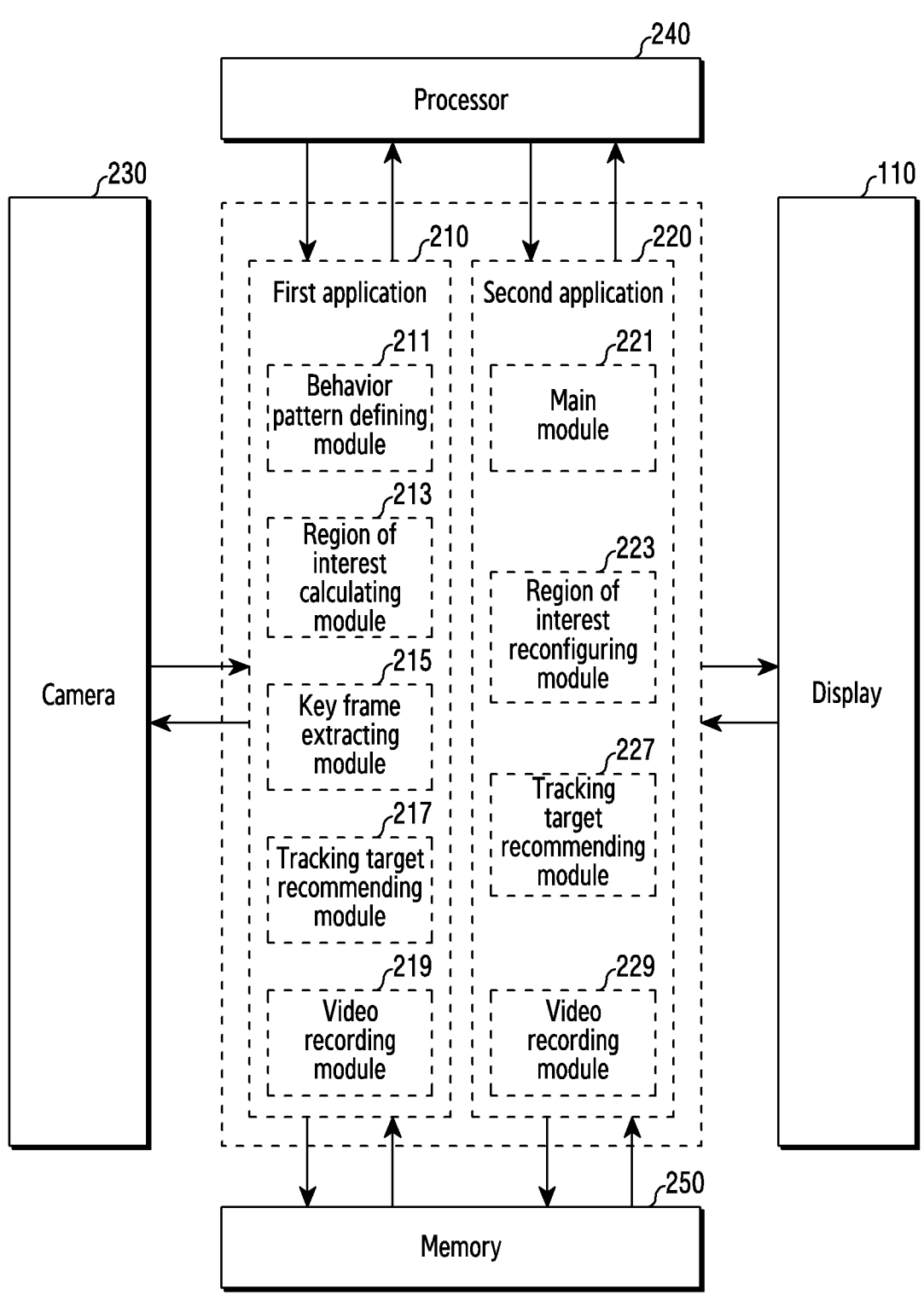
FIG. 2 illustrates a configuration for generating video data based on a set object of interest, in an electronic device according to an embodiment.

FIG. 2 illustrates a configuration for generating video data based on a set object of interest, in an electronic device according to an embodiment.

Referring to FIG. 2, the electronic device may use hardware and/or software modules to support functions for generating the video data based on the set object of interest. More specifically, a processor 240 may drive modules by executing instructions stored in a memory 250. The processor 240 may drive at least one module of a behavior pattern defining module 211, a region of interest calculating module 213, a key frame extracting module 215, a tracking target recommending module 217, a video recording module 219, a main module 221, a region of interest reconfiguring module 223, a tracking target recommending module 227, or a video recording module 229 by executing the instructions stored in the memory 250.

Different software modules from those illustrated in FIG. 2 may be implemented. For example, at least two modules of the software modules illustrated in FIG. 2 may be integrated into one module, and/or one module may be divided into two or more modules.

In addition, hardware and the software module may share one function to improve task performance. For example, the electronic device may include both an encoder implemented as hardware and an encoder implemented as a software module, part of data acquired through a camera 230 may be processed at the hardware encoder, and the remaining part may be processed at the software encoder.

The processor 240 may set a first object of interest in a plurality of image frames included in first video data through a first application 210, generate second video data based on the first object of interest from the first video data, and store the second video data in the memory 250. The processor 240 may extract at least one object included in the plurality of the image frames, set the first object of interest among the at least one object, determine a first region of interest including the first object of interest in the plurality of the image frames, and generate the second video data based on the first region of interest. To execute the first application 210, the processor 240 may drive at least one module of the behavior pattern defining module 211, the region of interest calculating module 213, the key frame extracting module 215, the tracking target recommending module 217, or the video recording module 219.

The behavior pattern defining module 211 may determine an overall operation style of the first application 210. To extract at least one object from a plurality of image frames included in video data, the behavior pattern defining module 211 may store features of the at least one objects in the memory 250, and provide the features to another module (e.g., the region of interest calculating module 213 or the tracking target recommending module 217). The at least one object may include a point including a face of a designated person, an animal of a designated type, or a sound over a reference volume. The behavior pattern defining module 211 may store, in the memory 250, information for setting the first object of interest among the extracted at least one object, and provide the information to another module. The behavior pattern defining module 211 may set an object including a designated face pre-stored in the memory 250 by another application (e.g., a gallery application) among the extracted at least one object as the first object of interest.

The region of interest calculating module 213 may extract at least one object from the plurality of the image frames included in the first video data, set the first object of interest among at least one object, and determine a first region of interest including the first object of interest in the plurality of the image frames. The region of interest calculating module 213 may include at least one submodule. The submodule may include at least one module of a face recognition module, an animal location recognition module, an object tracking module, a sound based location detection module, a body recognition module, an action recognition module, or a face expression recognition module. The submodule may extract at least one object using at least one result value of the camera 230, a microphone, and a sensor included in the electronic device. The submodule may output information corresponding to a position and a size of the at least one object in the plurality of the image frames.

The region of interest calculating module 213 may determine the first region of interest in the plurality of the image frames through the output result of the submodule. The region of interest calculating module 213 may set the first object of interest based on information of the extracted at least one object and information obtained from the behavior pattern defining module 211. The region of interest calculating module 213 may determine the first region of interest including the first object of interest in the plurality of the image frames. If there is one first object of interest, the region of interest calculating module 213 may determine the region of interest to place the first object of interest at a center of the first region of interest. However, if there are two or more first objects of interest, the region of interest calculating module 213 may determine a first region of interest, such that the first region of interest includes all of the first objects of interest, or determine the first region of interest to include at least a part of the first objects of interest. The region of interest calculating module 213 may provide information of the first region of interest to another module (e.g., the key frame extracting module 215 or the video recording module 219).

The key frame extracting module 215 may obtain key frame information based on the information obtained from the region of interest calculating module 213. The key frame information may include information related to an image frame in which at least one object is extracted in a pre-designated manner among the plurality of the image frames. The image frame corresponding to the key frame may include an image frame having a change over a specific level in the at least one object extracted from the plurality of the image frames. The key frame extracting module 215 may determine whether the at least one object is extracted in the pre-designated manner, through at least one of an object movement direction, an object size, and an object amount. For example, when an object amount included in the plurality of the image frames changes over a specific value within a specific time, the key frame extracting module 215 may determine that the object is extracted in the pre-designated manner. As another example, if detecting a face pre-registered at the electronic device in the image frame, or if newly detecting a position at which a sound is produced, the key frame extracting module 215 may determine that the object is extracted in the pre-designated manner.

The tracking target recommending module 217 may, before acquiring the first video data, display at least one object included in the image acquired through the camera 230 or other tracking target not included in the object on the display 110. The user may set a first object of interest based on the at least one object displayed on the display 110. For example, the electronic device may set the first object of interest by receiving a user input before acquiring the first video data, and generate second video data based on the set first object of interest. Alternatively, the tracking target recommending module 217 and the operations of the tracking target recommending module 217 may be omitted. The tracking target recommending module 217 may obtain at least one object information provided by the submodule included in the region of interest calculating module 213, and display the information on the display 110.

The video recording module 219 may store, in the memory 250, the information of the at least one object extracted from the plurality of the image frames included in the first video data, and/or the key frame information, together with the first video data obtained from the camera 230, and store the second video data generated based on the first object of interest in the memory 250. The video recording module 219 may store, in the memory 250, at least one of the first object of interest information, or the first region of interest information, together with the first video data.

The processor 240 may receive a user input for setting a second object of interest, which is different from the first object of interest, among the plurality of the image frames included in the first video data through a second application 220, generate third video data based at least on the second object of interest from the first video data, and store the third video data in the memory 250. The second application 220 may be a separate application distinguished from the first application 210. The first application 210 and the second application 220 may also be understood as different functions provided by the same application. For example, the first application 210 may film first video data (original) and generate second video data, and the second application 220 may generate third video data from the first video data, after generating the second video data.

The processor 240 may receive a user input for setting the second object of interest among the at least one object extracted from the plurality of the image frames included in the first video data, determine a second region of interest including at least the second object of interest, and generate the third video data based on the second region of interest. To execute the second application, the processor 240 may drive at least one module of the main module 221, the region of interest reconfiguring module 223, the tracking target recommending module 227, or the video recording module 229.

The main module 221 may receive the first video data from the memory 250 and display it on the display 110. The main module 221 may display on the display 110 at least one information of the at least one object information, the key frame information, the first object of interest information, or the first region of interest information, together with the first video data. The user may modify the object of interest or the region of interest in the image frame corresponding to the key frame based on the information displayed on the display 110, and the second application 220 may obtain the third video data different from the second video data based on the modified object of interest or region of interest.

In response to receiving the user input that sets the second object of interest, the region of interest reconfiguring module 223 may determine the second region of interest including the at least one second object of interest. The description herein of the region of interest calculating module 213 of the first application 210 may be also applied to the region of interest reconfiguring module 223.

Upon receiving the user input that sets the second object of interest in the image frame corresponding to the key frame, the region of interest reconfiguring module 223 may determine the second region of interest in the image frame corresponding to the key frame, and determine the second region of interest including at least the second object of interest even in the image frame not corresponding to the key frame. Through the user input that modifies the object of interest or the region of interest in the image frame corresponding to the key frame, the second application 220 may obtain the third video data generated based on the modified object of interest or region of interest.

The tracking target recommending module 227 may extract and display on the display 110 at least one object in the plurality of the image frames included in the first video data. The tracking target recommending module 227 may obtain information of the at least one object provided by the submodule of the region of interest calculating module 213, and display it on the display 110. Upon determining that the at least one object extracted in the first application 210 is not sufficient or not appropriate, the tracking target recommending module 227 may re-extract at least one object from the plurality of the image frames.

The video recording module 229 may store, in the memory 250, the third video data generated based on at least the second object of interest. The third video data may be other video data than the second video data. The video recording module 229 of the second application 220 may be integrated with the video recording module 219 of the first application 210 into one module, or may be configured as two modules which carry out the same function.

The descriptions of the tracking target recommending module 217 and the video recording module 219 herein may also be applied to the tracking target recommending module 227 and the video recording module 229 respectively.

The camera 230 may acquire video data, and provide the acquired video data to the processor 240. The camera 230 may film at least one object and provide the acquired first video data to the processor 240.

The processor 240 may include one or more processors. For example, the processor 240 may include at least one of an application processor (AP), an image signal processor (ISP), or a communication processor (CP).

The processor 240 may execute and/or control various functions supported in the electronic device. For example, the processor 240 may execute an application by executing code written in a programing language stored in the memory 250, and control various hardware. The processor 240 may execute the first application 210 supporting the filming function stored in the memory 250. The processor 240 may execute the camera 230 and set and support an appropriate shooting mode such that the camera 230 may perform a user's intended operation.

The processor 240 may store, in the memory 250, the video data (e.g., first video data) acquired through the camera 230, and display the filming video data (e.g., second video data) as a preview on the display 110.

The display 110 may display an execution screen of the first application 210, the second application 220, or a gallery application executed by the processor 240, or content (e.g., a still image or a moving image) stored in the memory 250. The processor 240 may display the video data acquired through the camera 230 or at least some area of the image frame included the video data as the preview on the display 110 in real time.

The display 110 may be integrated with a touch panel. The display 110 may support a touch function, and detect and provide a user input such as a touch using a finger to the processor 240. The display 110 may be connected with a display driver integrated circuit (DDIC) for driving the display 110, and the touch panel may be connected with a touch integrated circuit (IC) for detecting touch coordinates and processing a touch related algorithm. The DDIC and the touch IC may be integrated or may be separately formed. The DDIC and/or the touch IC may be electrically connected with the processor 240.

The memory 250 may store the video data by the processor 240, and store various programming languages or instructions. In FIG. 2, functions performed by the behavior pattern defining module 211, the region of interest calculating module 213, the key frame extracting module 215, the tracking target recommending module 217, the video recording module 219, the main module 221, the region of interest reconfiguring module 223, the tracking target recommending module 227, or the video recording module 229 are carried out by executing, at the processor 240, the instructions stored in the memory 250.

The electronic device may use one or more hardware processing circuits to perform various functions and operations described herein. For example, an AP included in the electronic device, an ISP mounted in the camera 230, a DDIC, a touch IC, a CP, or a hardware encoder may be used for implementations of various embodiments described herein.

In addition, the connections between the hardware and/or the software illustrated in FIG. 2 are for the sake of explanation, and do not limit the flow and/or the direction of the data or the instruction. The components included in an electronic device may have various electrical and/or operational connections.

Figure 3:
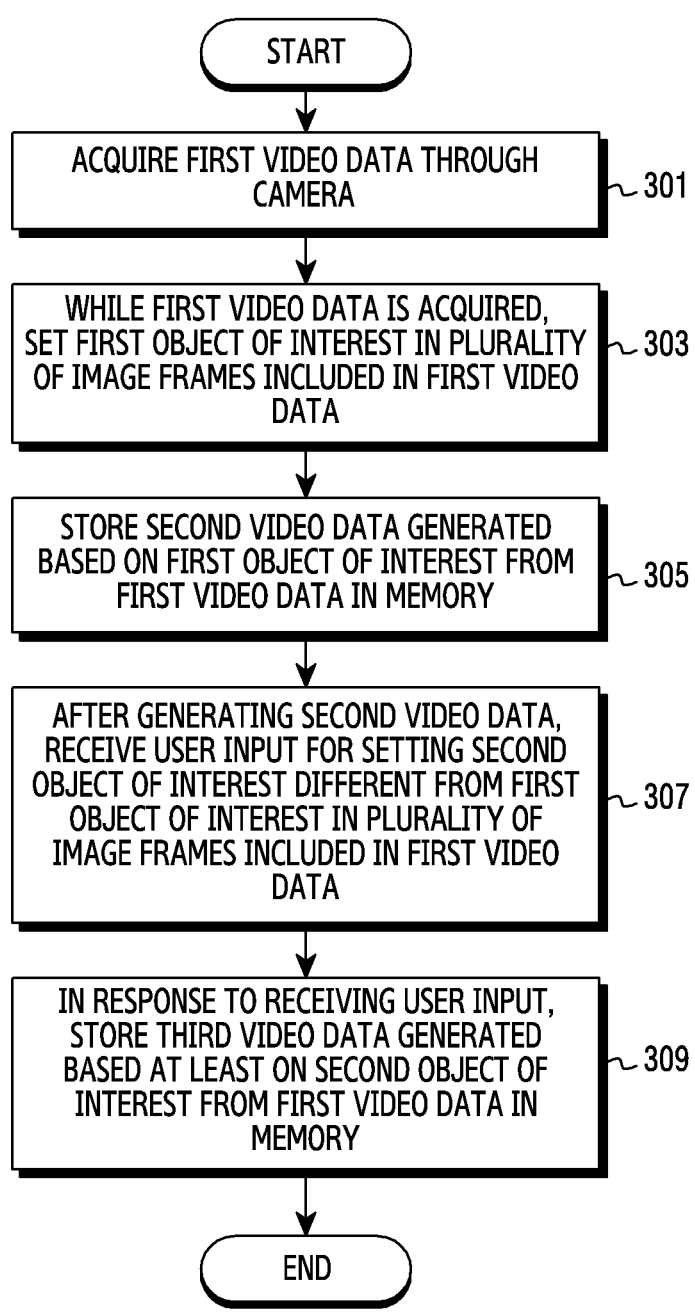
FIG. 3 is a flowchart illustrating a method for generating video data based on a set object of interest, in an electronic device according to an embodiment.

FIG. 3 is a flowchart illustrating a method for generating video data based on a set object of interest in an electronic device according to an embodiment. For example, the method of FIG. 3 is described below as being performed by the processor 240 in FIG. 2.

Referring to FIG. 3, in step 301, the processor 240 acquires first video data through the camera 230.

In step 303, while the first video data is acquired, the processor 240 sets a first object of interest in a plurality of image frames included in the first video data.

The processor 240 may extract at least one object from the plurality of the image frames included in the first video data. The processor 240 may extract at least one of a plurality of objects included in the plurality of the image frames by analyzing the plurality of the image frames.

The processor 240 may set a first object of interest among the extracted at least one object. The processor 240 may set at least part of the extracted at least one object to the first object of interest. For example, the processor 240 may set a first object of the at least one object to the first object of interest.

In step 305, the processor 240 stores, in the memory 250, second video data generated based on the first object of interest from the first video data. The processor 240 may store the second video data in the memory 250 after the acquisition of the first video data ends, or may generate second video data based on the first object of interest, and store the second video data in the memory 250, while first video data is acquired.

The processor 240 may determine a first region of interest including the first object of interest in the plurality of the image frames. The processor 240 may determine the first region of interest and then place the first object of interest at a center of the first region of interest. The processor 240 may generate the second video data based on the first region of interest. For example, the processor 240 may generate the second video data by cropping the first region of interest. Cropping the first region of interest at the processor 240 may include cutting other portion than a portion corresponding to the first region of interest in the plurality of the image frames.

The processor 240 may store the first video data in the memory 250, besides the second video data. The processor 240 may store, in the memory 250, information of the at least one object extracted from the plurality of image frames included in the first video data, together with the first video data. The electronic device may perform steps 307 through 309 using the at least one object information stored in the memory 250 together with the first video data.

The processor 240 may store, in the memory 250, at least one information of the first object of interest information or the first region of interest information, together with the at least one object information.

While acquiring the first video data, the processor 240 may display second video data on the display 110. While acquiring the first video data, the processor 240 may generate the second video data based on the first object of interest, and display the second video data on the display 110. During the video recording, the user may receive the second video data, which is a digital zoom video, according to an auto framing technology, as the preview. Alternatively, while acquiring the first video data, the processor 240 may display the first video data on the display 110 or may display the first video data and the second video data together on the display 110.

In step 307, after generating the second video data, the processor 240 receives a user input for setting a second object of interest, which is different from the first object of interest, in the plurality of the image frames included in the first video data.

The processor 240 may receive a user input for setting an object not included in the first object of interest among at least one object included in the plurality of the image frames to be the object of interest and/or a user input for releasing at least part of the object included in the first object of interest from the object of interest. After the processor 240 sets the first object of the first object and the second object extracted from the plurality of the image frames to the first object of interest, the processor 240 may receive a user input for setting the second object to the object of interest. In this case, the processor 240 may determine the user input for setting both the first object and the second object to the second object of interest. As another example, the processor 240 may receive a user input for releasing the first object from the object of interest, and setting the second object to the object of interest. In this case, the processor 240 may determine the user input for setting only the second object to the second object of interest. The user input may include a touch input for the first object or the second object received through the display 110.

In step 309, in response to receiving the user input, the processor 240 stores, in the memory 250, third video data generated based at least on the second object of interest from the first video data.

The processor 240 may determine a second region of interest including at least the second object of interest in the plurality of the image frames. For example, if the processor 240 determines the user input for setting the first object and the second object to the second object of interest, the processor 240 may determine the second region of interest including the first object and the second object. As another example, if the processor 240 determines the user input for setting the second object to the second object of interest, the processor 240 may determine the second region of interest including the second object.

The processor 240 may generate third video data based on the second region of interest, e.g., by cropping the second region of interest in the plurality of the image frames included in the first video data.

The processor 240 may store the third video data in the memory 350. The third video data may be different video data from the second video data. For example, a plurality of image frames included in the third video data may be generated by cropping a different region from a plurality of image frames included in the second video data among the plurality of the image frames included in the first video data. The second video data may be generated based on the first object from the first video data, and the third video data may be generated based on the first object and the second object from the first video data.

The processor 240 may store the third video data in the memory 250 and delete the second video data from the memory 250. For example, since the second video data is the video data generated based on the different object of interest (e.g., the first object of interest) from the object (e.g., the second object of interest) to be set to the object of interest by the user, the third video data is stored in the memory 250 and accordingly the second video data may be deleted from the memory 250.

The processor 240 may store the third video data in the memory 250 and delete the first video data from the memory 250. If the first video data is deleted from the memory 250, generating the third video data using the first video data may be no longer possible. Accordingly, the processor 240 may output a related notification. For example, the processor 240 may display a user interface (UI) including details on the display 110, or output an audio notification through a speaker, such that the user may select whether to delete the first video data.

Figure 4:
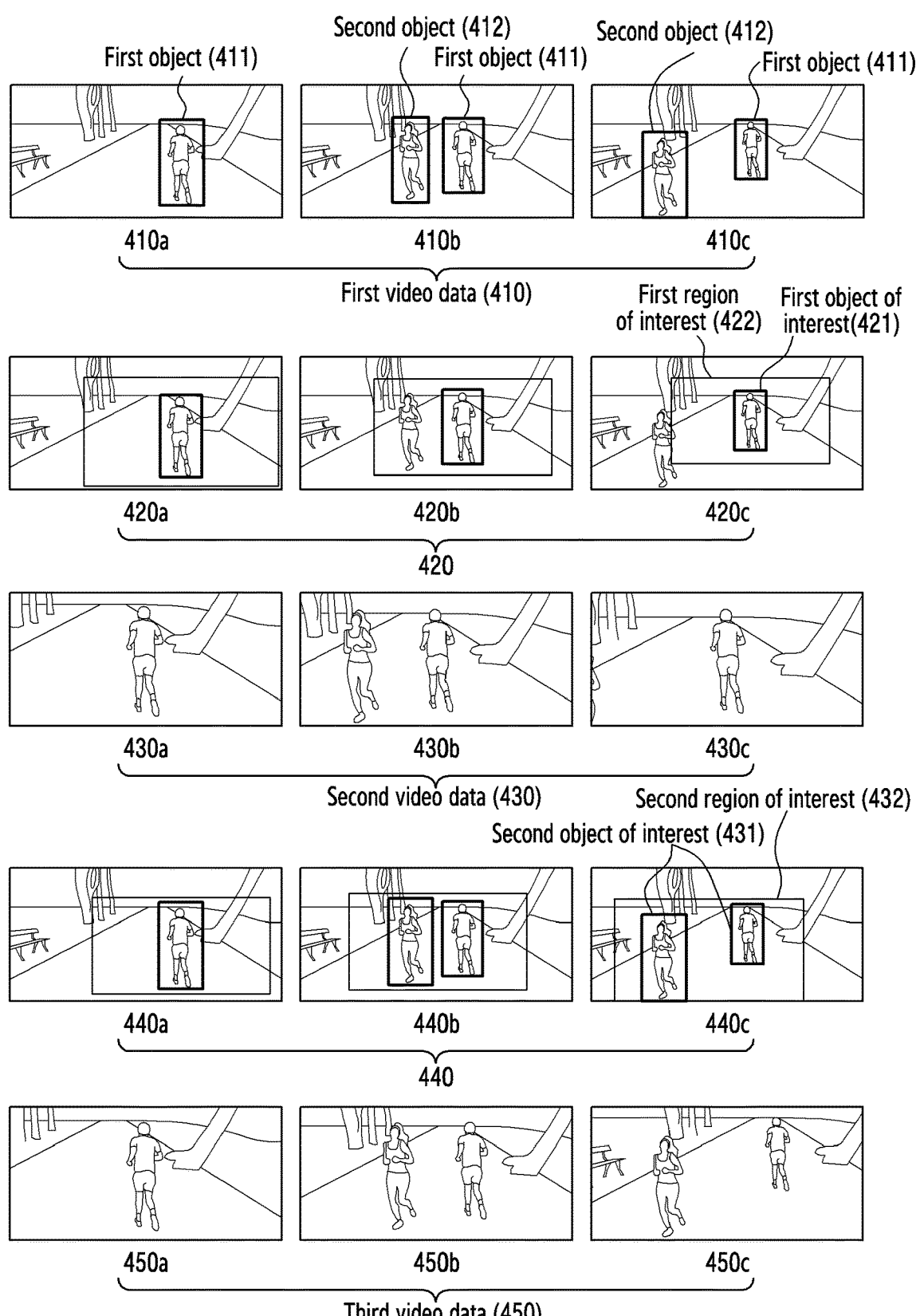
FIG. 4 illustrates first video data obtained at an electronic device, second video data, and a third video data generated based on a set object of interest according to an embodiment.

FIG. 4 illustrates first video data acquired at an electronic device, second video data, and third video data generated based on a set object of interest according to an embodiment.

Referring to FIG. 4, a plurality of image frames 410a, 410b, and 410c are included in first video data 410. The processor 240 may acquire the first video data 410 through the camera 230.

While acquiring the first video data 410, the processor 240 may extract at least one object included in the plurality of the image frames 410a, 410b, and 410c. For example, the processor 240 may extract a first object 411 and a second object 412 from the image frames 410a, 410b, and 410c. The processor 240 may store information of the first object 411 and the second object 412 in the memory 250, together with the first image data 410.

The processor 240 may use the output result of the submodule of the region of interest calculating module 213 to extract at least one object included in the image frames 410a, 410b, and 410c. The processor 240 may extract the first object 411 and the second object 412 using an output result of a body recognition module among the submodules of the region of interest calculating module 213. The submodule may extract the first object 411 and the second object 412 using at least one result value of the camera 230, the microphone, and the sensor included in the electronic device.

The submodule may output information corresponding to a position and a size of at least one object in the image frames 410a, 410b, and 410c. The submodule may output an extraction result of the at least one object in a rectangular form positioned inside the image frame 410a, 410b, or 410c. The information of the rectangular form may include position information of four vertexes of the rectangle based on a full resolution of the image frame 410a, 410b, or 410c. The processor 240 may store, in the memory 250, the position information of the four vertexes of the rectangle corresponding to the extraction result of the first object 411 and the position information of the four vertexes of the rectangle corresponding to the extraction result of the second object 412 in each image frame 410a, 410b, and 410c.

A plurality of image frames 420a, 420b, and 420c are provided in which a first region of interest 422 is determined, if the first object 411 is set to the first object of interest 421 in the first video data 410.

More specifically, the processor 240 may set the first object of interest 421 in the plurality of the image frames 410a, 410b, and 410c. The processor 240 may determine the first region of interest 422 including the first object of interest 421 in the image frames 420a, 420b, and 420c. The processor 240 may store information of the first object of interest 421 and information of the region of interest 422 in the memory 250, together with the information of the first video data 410, the first object 4111, and the second object 412.

The information of the first region of interest 422 may include rectangle information corresponding to a position and a size of the first region of interest 422 in the image frame 420a, 420b, or 420c. The information of the first region of interest 422 may include position information of four vertexes of the rectangle based on the full resolution of the image frame 420a, 420b, or 420c. The processor 240 may store, in the memory 250, the position information of the four vertexes of the rectangle corresponding to the first region of interest 422 in each image frame 420a, 420b, and 420c.

The processor 240 may determine the first region of interest 422 to place the first object of interest 421 at a center of the first region of interest 422. The processor 240 may determine the first region of interest 422, such that the first region of interest 422 does not exceed a range of the plurality of the image frames 410a, 410b, and 410c included in the first video data 410. The first region of interest 422 may have the same aspect ratio as the plurality of the image frames 410a, 410b, and 410c included in the first video data 410.

The processor 240 may determine the first region of interest 422 such that an area ratio occupied by the first object of interest 421 in the first region of interest 422 is relatively constant. To determine the first region of interest 422 such that a boundary of the first object of interest 421 is not within a present distance to a boundary of the first region of interest 422, the processor 240 may determine the first region of interest 422 to have a margin of a specific length inside the first region of interest 422.

A plurality of image frames 430a, 430b, and 430c are included in second video data 430, which is generated based on the first object of interest 421 from the first video data 410.

The processor 240 may generate the second video data 430 based on the first region of interest 422 including the first object of interest 421, and store the second video data 430 in the memory 250. The processor 240 may generate the image frames 430a, 430b, and 430c included in the second video data 430 by cropping the first region of interest 422 in the plurality of the image frames 410a, 410b, and 410c included in the first video data 410.

The second video data 430 may be data generated based on the first object of interest 421 (e.g., the first object 411). The second video data 430 may be data generated by cropping the plurality of the image frames included in the first video data 410 to place the first object 411 at the center of the image frame.

While acquiring the first video data 410 through the camera 230, the processor 240 may generate the second video data 430, and display the second video data 430 as the preview on the display 110. Alternatively, while acquiring the first video data 410 through the camera 230, the processor 240 may display the first video data 130 on the display 110, or display the first video data 410 and the second video data 430 together on the display 110.

A plurality of image frames 440a, 440b, and 440c are provided, in which a second region of interest 432 is determined, if the first object 411 and the second object 412 are set to a second object of interest 431 in the first video data 410.

More specifically, after generating the second video data 430, the processor 240 may receive a user input for setting the second object 412 to the object of interest. The processor 240 may determine the user input which sets the first object 411 and the second object 412 included in the image frames 410a, 410b, and 410c to the second object of interest 431.

In response to receiving the user input that sets the first object 411 and the second object 412 to the second object of interest 431, the processor 240 may set the second region of interest 432 including at least the second object of interest 431 (e.g., the first object 411 and the second object 412).

A plurality of image frames 450a, 450b, and 450c are included in third video data 450, which is generated based on the second object of interest 431 from the first video data 410.

The processor 240 may generate the third video data 450 based on the second region of interest 432 including at least the second object of interest 431, and store the third video data 450 in the memory 250. For example, the processor 240 may generate the image frames 450a, 450b, and 450c included in the third video data 450 by cropping the second region of interest 432 in the plurality of the image frames 410a, 410b, and 410c included in the first video data 410.

The third video data 450 may be generated based on the second object of interest 431 (e.g., the first object 411 and the second object 412). The third video data 450 may be generated by cropping the image frames 410a, 410b, and 410c included in the first video data 410 to place centers of the first object 411 and the second object 412 at the center of the image frame, or to place both the first object 411 and the second object 412 within the image frame.

The second video data 430 and the third video data 450 may be different video data. For example, the processor 240 sets the first object 411 to the first object of interest 421 using the first application 210, and generates the second video data 430 based on the first object of interest 421, but the user may intend to acquire a video including both the first object 411 and the second object 412. The processor 240, which stores the first video data 410 as well as the second video data 430 in the memory 250, may acquire the third video data 450 including both the first object 411 and the second object 412 using the second application 220.

Figure 5:
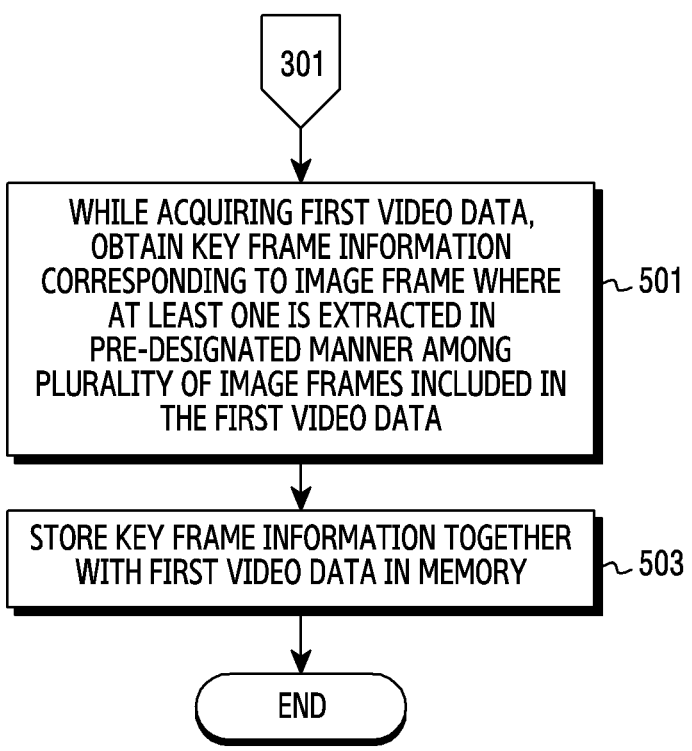
FIG. 5 is a flowchart illustrating a method for obtaining and storing key frame information in an electronic device according to an embodiment.

FIG. 5 is a flowchart illustrating a method for obtaining and storing key frame information in an electronic device according to an embodiment. For example, the method of FIG. 5 is described below as being performed by the processor 240 in FIG. 2, and may be performed in step 301 of FIG. 3.

Referring to FIG. 5, in step 501, while acquiring first video data, the processor 240 obtains key frame information corresponding to a key frame among a plurality of image frames included in the first video data. The key frame may be a frame corresponding to an image frame where at least one object is extracted from the plurality of the image frames in a pre-designated manner.

The processor 240 may determine the image frame where at least one object is extracted from the plurality of the image frames in the pre-designated manner as the key frame. For example, the image frame corresponding to the key frame may include an image frame in which the at least one object extracted from the plurality of the image frames included in the first video has a change over a specific level.

The processor 240 may determine whether the at least one object is extracted in the pre-designated manner, through at least one of an object movement direction, an object size, and an object amount. For example, if the object amount included in the plurality of the image frames changes over a specific value within a specific time, the processor 240 may determine that the object has been extracted in the pre-designated manner. As another example, if detecting a face pre-registered at the electronic device in the plurality of the image frames, or if newly detecting a position of a sound, the processor 240 may determine that the object has been extracted in the pre-designated manner.

In step 503, the processor 240 stores key frame information together with the first video data in the memory 250. The processor 240 may store, in the memory 250, at least part of at least one object information, key frame information, first object of interest information, and first region of interest information, together with the first video data.

Figure 6:
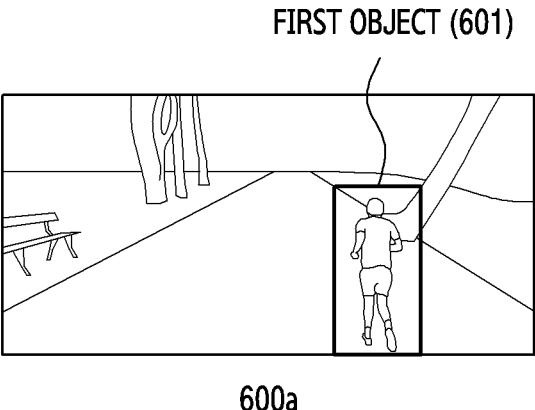
FIG. 6 illustrates image frames included in a key frame according to an embodiment.
Figure 6:
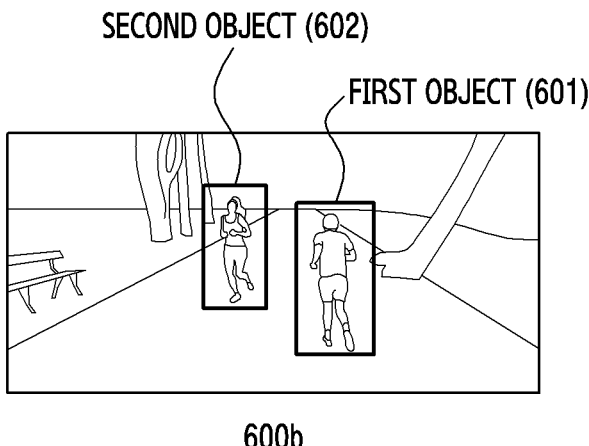
Figure 6:
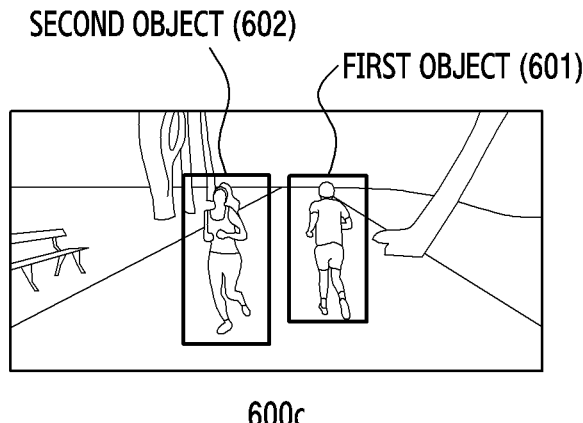

FIG. 6 illustrates image frames included in a key frame according to an embodiment.

Referring to FIG. 6, while acquiring the first video data through the camera 230, the processor 240 may extract a first object 601 and a second object 602 in a plurality of the image frames 600a, 600b, and 600c.

While acquiring the first video data, the processor 240 may obtain key frame information corresponding to an image frame in which at least one object is extracted from the plurality of the image frames in a pre-designated manner. The processor 240 may obtain the key frame information through an object amount extracted from the image frame. For example, an image frame corresponding to a timing at which the object amount extracted from the image frame changes may be included in the key frame. As another example, an image frame corresponding to a timing after a specific time passes from the timing at which the object amount extracted from the image frame changes may be included in the key frame.

The processor 240 may extract the first object 601 in the image frame 600a, and extract the first object 601 and the second object 602 in the image frames 600b and 600c. If an image frame in which the processor 240 first extracts the second object 602 is the image frame 600b, the image frame 600b may correspond to the key frame. Alternatively, the processor 240 may determine the image frame 600c, which is captured after a specific time passes from the capturing of the image frame 600b in which the second object 602 is extracted first, as corresponding to the key frame.

The processor 240 may store key frame information together with the first video data in the memory 250. For example, the processor 240 may store, in the memory 250, information that at least one of the image frames 600b or 600c corresponds to the key frame.

Figure 7:
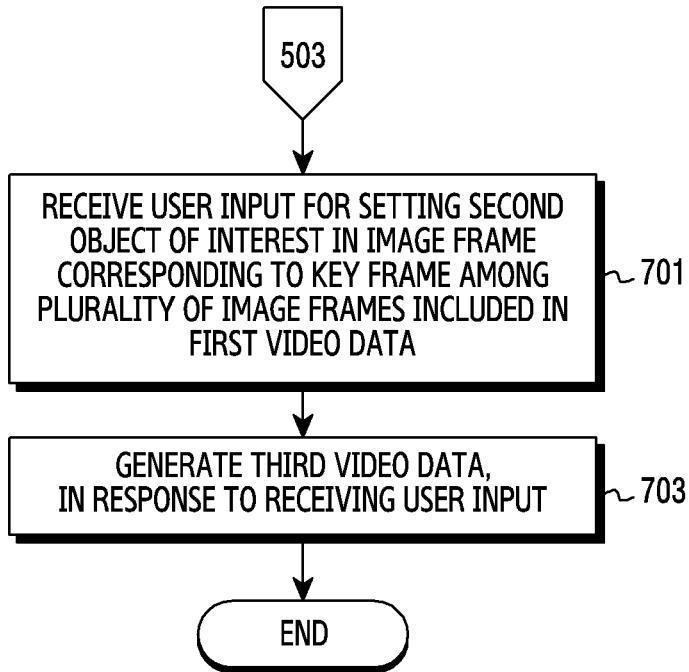
FIG. 7 is a flowchart illustrating a method obtaining third video data using key frame information in an electronic device according to an embodiment.

FIG. 7 is a flowchart illustrating a method for obtaining third video data using key frame information in an electronic device according to an embodiment. For example, the method in FIG. 7 is described below as being performed by the processor 240 in FIG. 2, and the method may be performed in step 503 of FIG. 5.

Referring to FIG. 7, in step 701, the processor 240 receives a user input for setting a second object of interest in an image frame corresponding to a key frame among a plurality of image frames included in first video data.

The processor 240 may receive a user input for setting a second object of interest in an image frame corresponding to a key frame, using the key frame information described in relation to FIG. 5. To generate third video data different from second video data, the electronic device may receive the user input for setting the second object of interest in the key frame, without having to separately receive a user input for setting the second object of interest in the plurality of image frames included in the first video data.

The processor 240 may receive a user input for changing a region of interest, besides the user input for setting the second object of interest in the image frame corresponding to the key frame. For example, the processor 240 may set the second object of interest which is the same as the first object of interest, and receive a user input that changes at least one of a size or a position of the second region of interest. The user input may include a touch input (e.g., drag, drop) through the display 110.

As another example, the processor 240 may receive a user input for setting a second object different from the first object of interest, determine and display on the display 110 a second region of interest including the second object of interest, and receive a user input for changing the second region of interest. The user may modify at least one of the object of interest or the region of interest in the image frame corresponding to the key frame.

The processor 240 may receive a user input for adding, removing, or modifying the key frame, besides the user input for setting the second object of interest. For example, the processor 240 may receive a user input that includes an image frame not included in the key frame information stored in step 503 of FIG. 5 into the key frame information, receive a user input which excludes an image frame included in the key frame information stored in step 503 of FIG. 5 from the key frame information, or receive a user input for including a frame before or after an image frame included in the key frame information stored in step 503 of FIG. 5 into the key frame information. If the processor 240 receives the user input for adding a key frame, the processor 240 may receive a user input for setting the second object of interest, even in an image frame corresponding to the added key frame.

In step 703, the processor 240 generates third video data, in response to receiving the user input.

The processor 240 may determine the second region of interest including the second object of interest in the image frame corresponding to the key frame in response to the user input. The processor 240 may determine the second region of interest including the second object of interest even in the image frame not corresponding to the key frame. For example, the processor 240 may calculate the second region of interest, even in the image frame not corresponding to the key frame, by driving the region of interest reconfiguring module 223. If receiving the user input in the image frame corresponding to the key frame, the electronic device may reconfigure the second region of interest in the plurality of the image frames including the image frame not corresponding to the key frame.

Because the third video data may be generated through the user input that sets the second object of interest in the image frame corresponding to the key frame, although the user does not set the second object of interest in the plurality of the image frames, it may be easy to generate video data based on a new object of interest.

Figure 8:
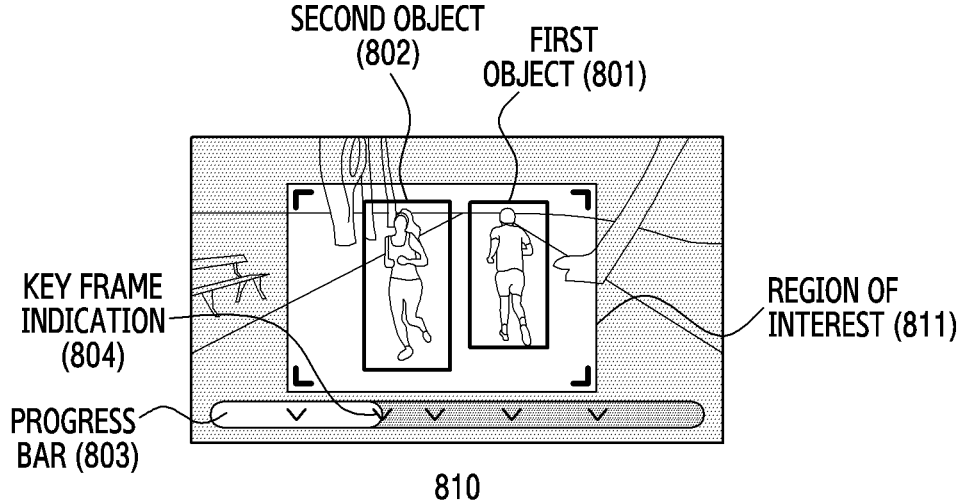
FIG. 8 illustrates a region of interest based on different objects of interest in an electronic device according to an embodiment.
Figure 8:
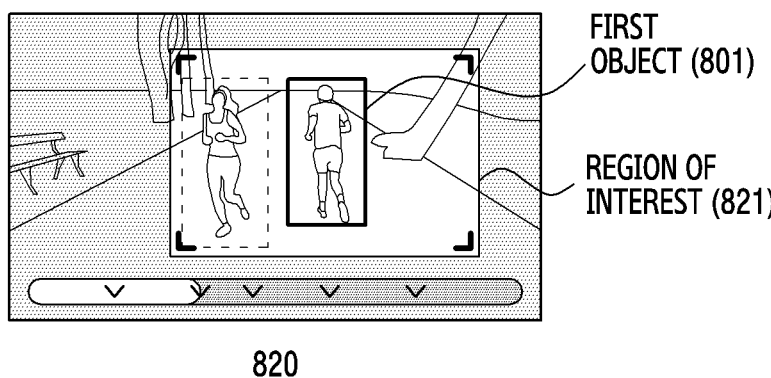
Figure 8:
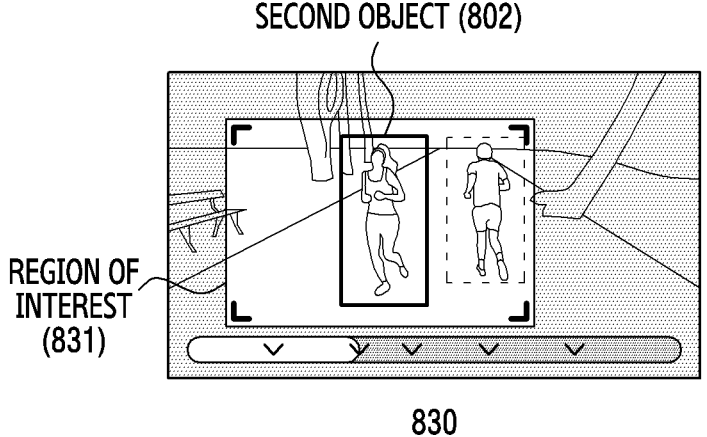

FIG. 8 illustrates a region of interest based on different objects of interest in an electronic device according to an embodiment.

Referring to FIG. 8, regions of interest are determined in execution screens 810, 820, and 830 according to a different object of interest in an image frame corresponding to a key frame, and the second application 220 for modifying the region of interest.

More specifically, the processor 240 displays a progress bar 803, and a key frame indication 804 in the execution screen of the second application 220 on the display 110. The processor 240 may display the progress bar 803 in a bar shape indicating time flow of first video data. The processor 240 may display the key frame indication 804 to correspond to a timing of the image frame included in the key frame among a plurality of image frames in the first video data. For example, the processor 240 may display the key frame indication 804 in a 'V' shape inside the progress bar 803.

The processor 240 may display, on the display 110, an image frame corresponding to a corresponding key frame through a user input for the key frame indication 804. The user may touch the key frame indication 804, and the processor 240 may display on the display 110 the image frame corresponding to the corresponding key frame 804 in response to receiving the touch input.

Execution screen 810 includes a region of interest 811 with the first object 801 and the second object 802 set to the object of interest in the execution screen of the second application 220. The processor 240 may determine the region of interest 811 to include both the first object 801 and the second object 802. If the first object 801 and the second object 802 are set to the first object of interest in the first application 110, the first region of interest may be the region of interest 811. The processor 240 may display the execution screen 810 on the display 110 before receiving a user input that sets a second object of interest. As another example, if the processor 240 receives a user input that sets the first object 801 and the second object 802 to the second object of interest, the second region of interest may be the same as the region of interest 811. The processor 240 may display the execution screen 810 on the display 110, after receiving the user input.

The processor 240 may store, in the memory 250, first object of interest information and/or first region of interest information together with first video data. Hence, in the execution screen of the second application 220, the processor 240 may display, on the display 110, the first object of interest and the first region of interest together with the image frame included in the first video data before receiving a separate user input.

Execution screen 820 includes a region of interest 821 with the first object 801 set to the object of interest in the second application 220. For example, if the processor 240 receives a user input that sets the first object 801 to the second object of interest, the processor 240 may determine the second region of interest (e.g., the region of interest 821) including the first object 801.

Execution screen 830 includes a region of interest 831 with the second object 802 set to the object of interest in the second application 220. For example, if the processor 240 receives a user input that sets the second object 802 to the second object of interest, the processor 240 may determine the second region of interest 831 including the second object 802.

Figure 9:
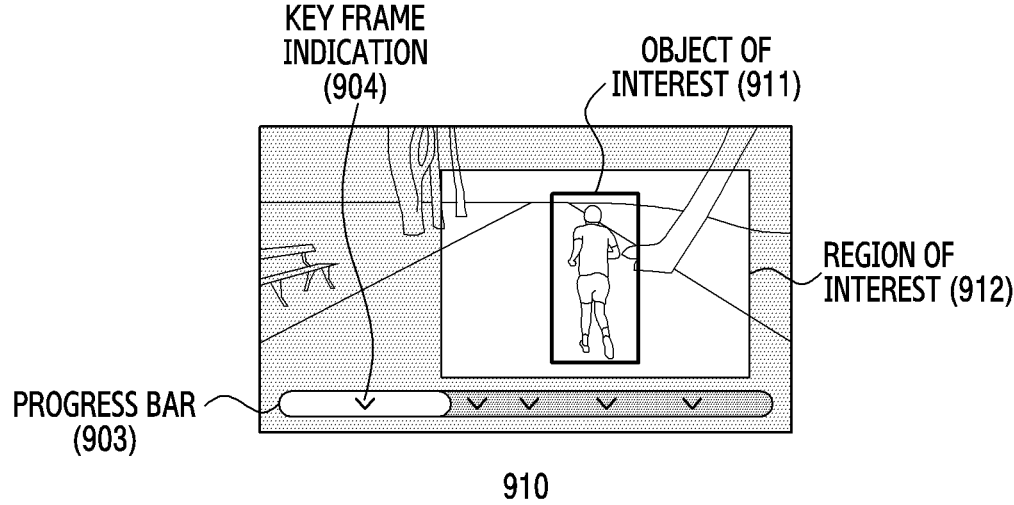
FIG. 9 illustrates a process of obtaining third video data using key frame information in an electronic device according to an embodiment.
Figure 9:
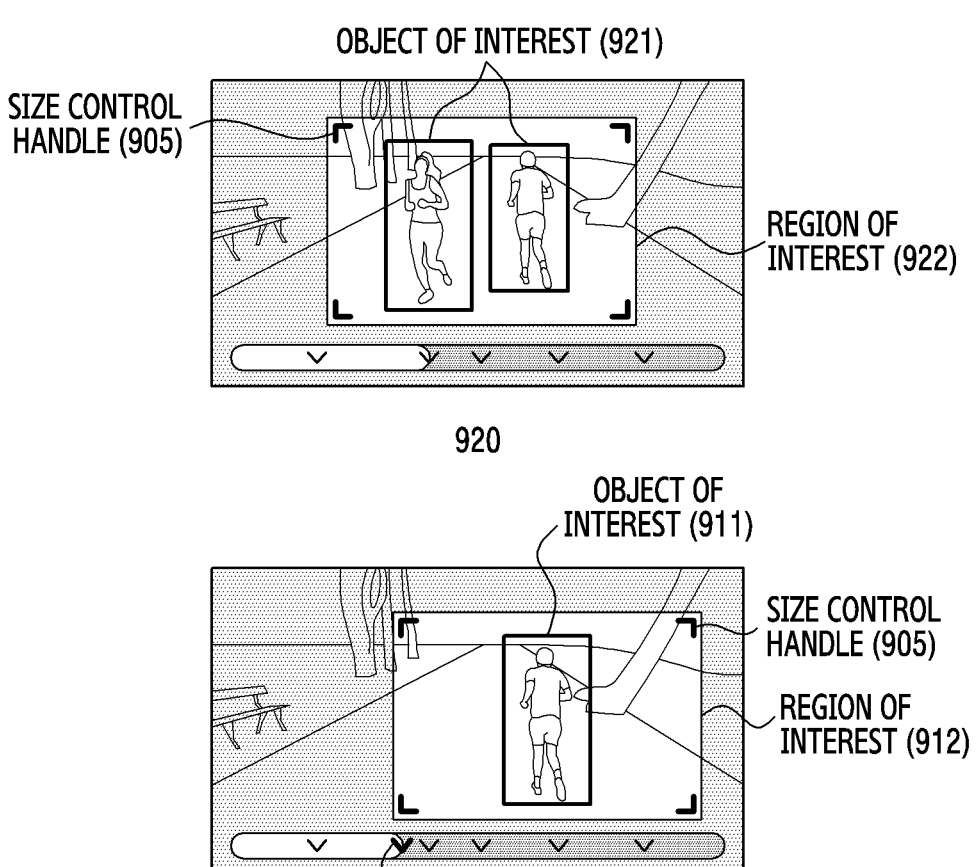

FIG. 9 illustrates a process of obtaining third video data using key frame information in an electronic device according to an embodiment.

Referring to FIG. 9, execution screen 910 of an image frame not corresponding to a key frame in second application 220. The processor 240 may display a progress bar 903, and a key frame indication 904 on the display 110.

The processor 240 may determine a region of interest 912 including an object of interest 911, and distinguish and display, on the display 110, the region of interest 912 and a region that is not the region of interest 912 in the execution screen 910 of the second application 220. For example, the processor 240 may distinguish and display, on the display 110, the region of interest 912 and the region that is not the region of interest 912 through shadow or lines.

The processor 240 may deactivate a function for modifying the object of interest 911 or modifying the region of interest 912 in the image frame not corresponding to the key frame. For example, the processor 240 may not display a size control handle 905 at four vertexes of the region of interest 912 in the execution screen 910 of the second application 220 displayed on the display 110, in the image frame not corresponding to the key frame.

The processor 240 may receive a user input for adding even an image frame not corresponding to the key frame into the key frame. For example, the processor 240 may determine the user input, if receiving a touch input to a separate UI displayed on the display 110, or receiving a touch input over a specific time to at least part of the execution screen of the second application 220. Upon receiving the user input that adds the key frame, the processor 240 may change from the execution screen 910 to the execution screen 930.

Execution screen 920 may be displayed on the display 110 in the image frame corresponding to the key frame in the second application 220.

The processor 240 may activate the function for modifying an object of interest 921 or modifying the region of interest 922 in the image frame corresponding to the key frame. For example, the processor 240 may display the size control handle 905 at four vertexes of the region of interest 922 in the execution screen 920 of the second application 220 displayed on the display 110, in the image frame corresponding to the key frame. If receiving a user input (e.g., drag, drop) to the size control handle 905, the processor 240 may change a position and a size of the region of interest 922, and display the changed region of interest 922 on the display 110. The user may modify the size of the region of interest 922 through the user input to the size control handle 905.

The processor 240 may change the object of interest 921 through a user input to the object of interest 921 in the image frame corresponding to the key frame. For example, if receiving a user input (e.g., a touch input) to at least a partial object of the object of interest 921, the processor 240 may release the object from the object of interest. If re-receiving a user input for the object, the processor 240 may set the object to the object of interest. The user may set the second object of interest through a touch input to a designated object.

Execution screen 930 of the second application 220 may be displayed on the display 110 in a corresponding image frame, if a user input for adding an image frame not corresponding to the key frame into the key frame is received.

If there is a user input for adding an image frame not included in the key frame information into the key frame, the processor 240 may include a corresponding image frame into the key frame information. To modify the object of interest 911 or the region of interest 912, even in the image frame not included in the key frame, the user may add a corresponding image frame into the key frame information.

Even in the image frame added to the key frame by the user input, the processor 240 may display the size control handle 905 for adjusting the size of the region of interest 912. The user may adjust the size and the position of the region of interest 912 through a touch input (e.g., drag, drop) to the size control handle 905.

Even in the image frame added into the key frame by the user input, the processor 240 may receive a user input for modifying the object of interest 911 (e.g., releasing from the object of interest or setting as the object of interest).

With respect to the key frame detected by the processor 240 and the key frame according to the user's input, the processor 240 may display different key frame indications on the display 110. The processor 240 may display the key frame indication 904 for the key frame detected by the processor 240, and a key frame indication 906 for the key frame according to the user's input. For example, the processor 240 may display the key frame indication 904 in red, and the key frame indication 906 in blue on the display 110.

Figure 10:
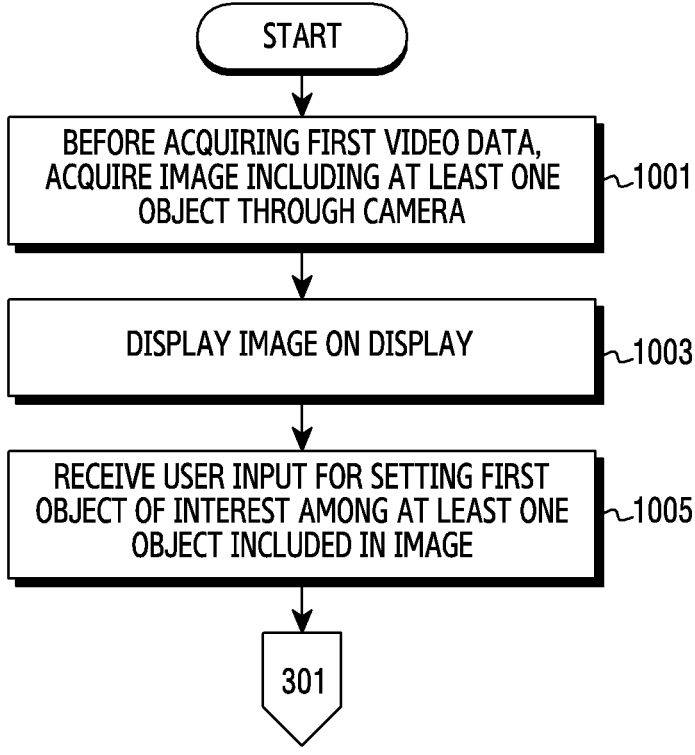
FIG. 10 is a flowchart illustrating a method for setting an object of interest before acquiring video data in an electronic device according to an embodiment.

FIG. 10 is a flowchart illustrating a method for setting an object of interest before acquiring video data in an electronic device according to an embodiment. For example, the method in FIG. 10 is described as being performed by the processor 240 in FIG. 2.

Referring to FIG. 10, in step 1001, the processor 240 acquires an image including at least one object through the camera 230, before acquiring first video data. The image may correspond to a still image or a moving image including at least one object.

The processor 240 may extract at least one object from at least one image frames included in the image.

In step 1003, the processor 240 displays the image on the display 110.

The processor 240 may display on the display 110 information of the extracted at least one object together with the image.

In step 1005, the processor 240 receives a user input for setting a first object of interest among the at least one object included in the image.

The processor 240 may receive a user input for setting a first object of interest among the at least one object displayed on the display 110. The user may set the first object of interest among the at least one object displayed on the display 110.

The processor 240 may set a first object of interest based on the user input, and generate second video data based on the first object of interest while acquiring the first video data, in relation to steps 303 and 305 in FIG. 3. The electronic device may obtain a separate image before acquiring the first video data, and set the first object of interest based on the user input, such that the second video data generated while acquiring the first video data corresponds to video data generated by setting a user's intended object to the first object of interest.

The processor 240 may recommend another tracking target, which is not included in the image, as the first object of interest. For example, if at least one object included in the image does not include an object to be set to the first object of interest by the user, the processor 240 may display on the display 110 other tracking targets among objects not included in the image, according to receiving a user input for receiving the other tracking target. The processor 240 may display, on the display 110, a button for the user input for receiving the other tracking target together with information of the at least one object, and display the other tracking target on the display 110, if receiving the user input via the button. For example, the other tracking target may include face or animal information pre-stored through other application (e.g., a gallery application) of the electronic device.

A display order of objects included in the other tracking target on the display 110 may be determined based on at least one of the number of times of storing in the electronic device, similarity with at least one object extracted in the image, frequency of setting as the object of interest, and/or an order of objects recently included in the object of interest. However, the display order of the objects included in the other tracking target may also be determined according to different criteria.

Figure 11:
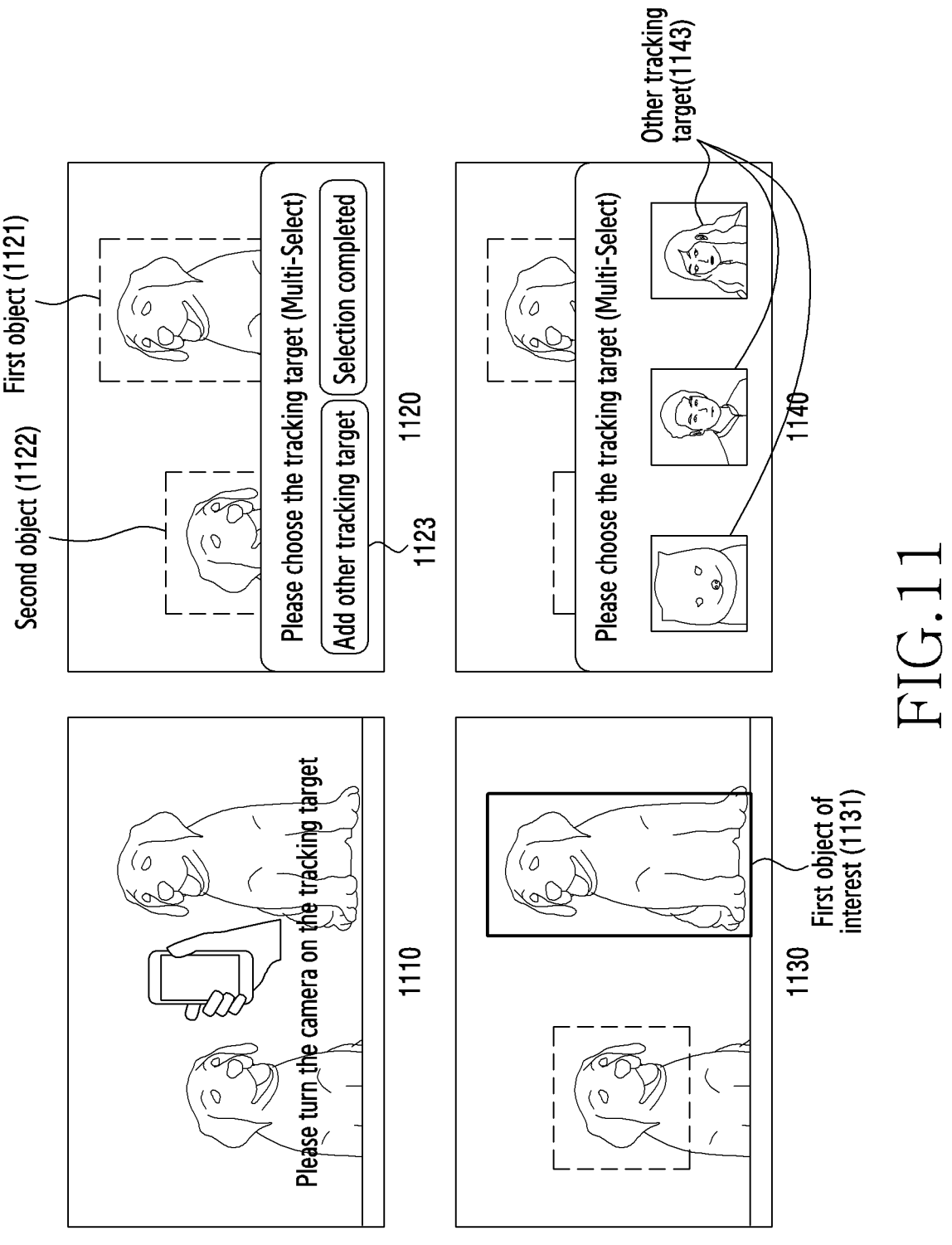
FIG. 11 illustrates a process of setting an object of interest before acquiring video data in an electronic device according to an embodiment.

FIG. 11 illustrates a procedure for setting an object of interest before acquiring video data in an electronic device according to an embodiment.

Referring to FIG. 11, execution screen 1110 may correspond to a start screen of the first application 210 displayed by the processor 240 on the display 110. The processor 240 may display the execution screen 1110 on the display 110, and then obtain an image including at least one objects.

Execution screen 1120 may be displayed by the processor 240 on the display 110 by extracting at least one object included in the obtained image. The processor 240 may extract at least one object included in at least one image frame included in the image by analyzing the image, and display the extracted at least one object on the display 110. For example, the processor 240 may extract a first object 1121 and a second object 1122 in the image, and display them in a rectangular form together with the image.

The processor 240 may receive a user input for determining at least one object of the first object 1121 or the second object 1122 as a first object of interest in the execution screen 1120. For example, the processor 240 may receive the user input that sets the first object 1121 as a first object of interest 1131. Upon receiving the user input, the processor 240 may display the execution screen 1130 on the display 110.

Upon receiving a user input to a 'selection completed' button, the processor 240 may set at least one object of interest which is set before the user input to the first object of interest, and perform step 301 in FIG. 3.

Execution screen 1130 of the first application 210 may be displayed on the display 110, if the processor 240 receives the user input for setting the first object of interest 1131.

The processor 240 may differently display a rectangle corresponding to the first object of interest 1131 and a rectangle corresponding to another object (e.g., the second object 1122), different than the first object of interest 1131, on the display 110. For example, the processor 240 may display the first object of interest 1131 with solid lines, and the second object 1122, which is not the first object of interest 1131, with dotted lines on the display 110. As another example, the processor 240 may shade a region outside of a region which is set to the first object of interest 1131.

Execution screen 1140 may be displayed on the display 110, if the processor 240 receives a user input for an 'add other tracking target' button 1123 in execution screen 1120. For example, if at least one of the first object 1121 or the second object 1122 included in the image acquired through the camera 230 does not include an object to be set to the first object of interest 1131, the user may touch the 'add other tracking target' button 1123 displayed on the display 110. As another example, the processor 240 may display the execution screen 1140 on the display 110 through an input to a separate physical button or a user's voice input.

Upon receiving a user input to the 'add other tracking target' button 1123, the processor 240 may display other tracking target 1143 on the display 110. For example, the other tracking target 1143 may include face or animal information pre-stored through another application (e.g., a gallery application) of the electronic device.

A display order of objects included in the other tracking target 1143 on the display 110 may be determined based on at least one of the number of times of storing in the electronic device, similarity with at least one object extracted in the image, frequency of setting as the object of interest, or an order of objects recently included in the object of interest. For example, since the first object 1121 and the second object 1122 correspond to puppies, the processor 240 may display, on the display 110, a puppy image that is pre-stored in the electronic device first among the other tracking targets 1143.

Upon receiving a user input that sets at least one object of the other tracking targets 1143 to the first object of interest, the processor 240 may generate second video data based on the first object of interest.

Figure 12:
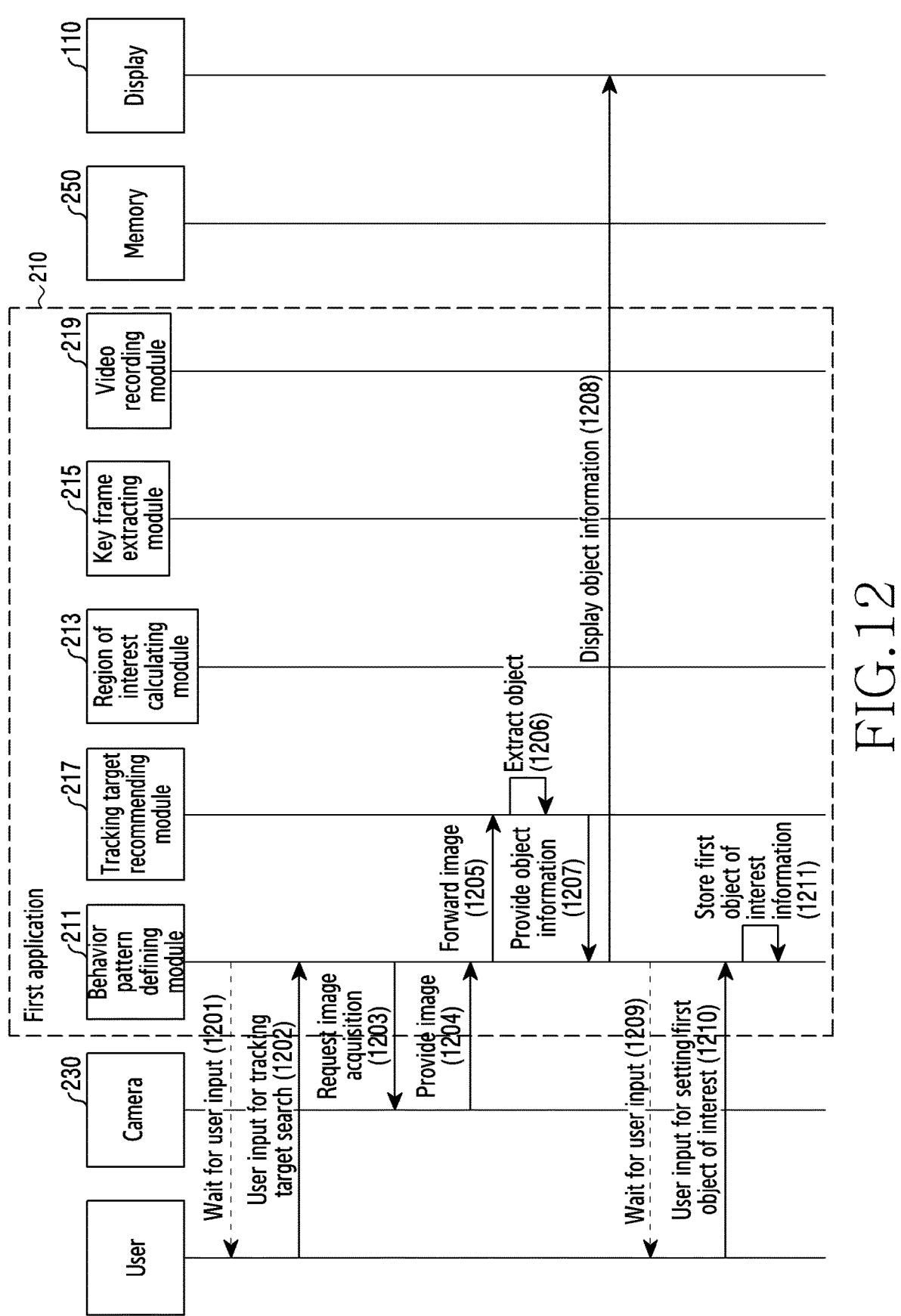
FIG. 12 is a signal flow diagram illustrating a method using a first application in an electronic device according to an embodiment.

FIG. 12 is a signal flow diagram illustrating a method using a first application in an electronic device according to an embodiment.

Referring to FIG. 12, the processor 240 may obtain an image before obtaining first video data through the first application 210, display, on the display 110, at least one object included in the image or other tracking target not included in the image, and receive a user input for setting a first object of interest among the at least one object or the other tracking target.

In step 1201, the electronic device may be in a standby state for receiving a user input in. For example, the behavior pattern defining module 211 may wait for a user input for a tracking target search.

The behavior pattern defining module 211 may receive the user input for the user's tracking target search in step 1202. For example, the user input may include a touch input to a button (e.g., a UI, a soft button, etc.) of the tracking target search, or a voice input for the tracking target search.

The behavior pattern defining module 211 may request image acquisition from the camera 230 based on the user input for the user's tracking target search in step 1203. Even if not receiving the user input for the tracking target search, the behavior pattern defining module 211 may perform the image acquisition request and the following operations. For example, if the first application 210 is executed, the processor 240 may perform the processes described above with reference to FIG. 10 and FIG. 11, even without a separate user input.

In step 1204, the camera 230 may provide an image to the behavior pattern defining module 211. The image may correspond to an image including at least one object, e.g., a still image or a moving image.

In step 1205, the behavior pattern defining module 211 may forward the image to the tracking target recommending module 217.

In step 1206, the tracking target recommending module 217 may extract at least one object in the obtained image. The tracking target recommending module 217 may extract at least one object by analyzing at least one image frame included in the image obtained from the behavior pattern defining module 211.

If the tracking target recommending module 217 is unable to extract at least one object included in the image, the behavior pattern defining module 211 may re-request the image acquisition (e.g., in step 1203) from the camera 230. Steps 1203 through 1206 may be repeated.

In step 1207, the tracking target recommending module 217 may provide information of the extracted at least one object to the behavior pattern defining module 211.

In step 1208, the behavior pattern defining module 211 may display the at least one object information on the display 110. For example, the behavior pattern defining module 211 may display the object information together with the image in a rectangle form on the display 110.

In step 1209, the electronic device may wait to receive a user input. For example, the behavior pattern defining module 211 may wait for the user input which sets a first object of interest.

In step 1210, the behavior pattern defining module 211 may receive a user input that determines the first object of interest. The user may set at least part of at least one object displayed on the display 110 to the first object of interest.

The behavior pattern defining module 211 may set a tracking target, other than the at least one object extracted from the image, as the first object of interest. For example, the behavior pattern defining module 211 may display an 'add other tracking target' button (e.g., the button 1123 of FIG. 11) with at least one object on the display 110, and receive a touch input to the button. The behavior pattern defining module 211 may display another tracking target, which is the object not included in the image, on the display 110. The behavior pattern defining module 211 may set at least part of the other tracking target to the first object of interest.

In step 1211, the behavior pattern defining module 211 may store information of the first object of interest. For example, based on the first object of interest, the processor 240 may generate second video data from the first video data acquired through the camera 230.

Figure 13:
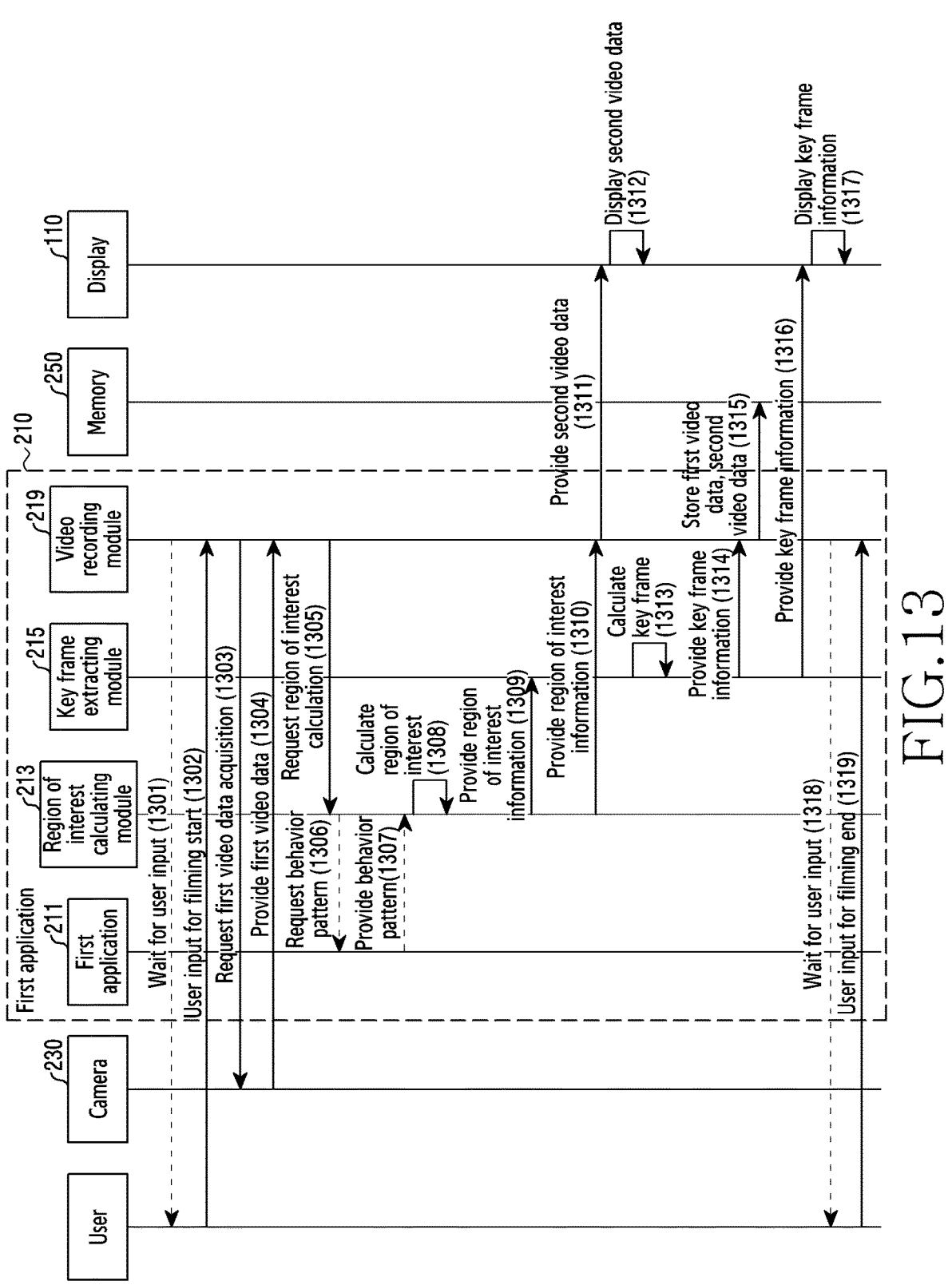
FIG. 13 is a signal flow diagram illustrating a method using a first application in an electronic device according to an embodiment.

FIG. 13 is a signal flow diagram illustrating a method using a first application in an electronic device according to an embodiment. For example, the processor 240 may perform the method in FIG. 13 after performing the method in FIG. 12, or, the processor 240 may omit the method in FIG. 12 and perform the method in FIG. 13 instead.

Referring to FIG. 13, the electronic device may wait to receive a user input in step 1301. For example, the video recording module 219 may wait for a user input for filming start.

In step 1302, the video recording module 219 may receive the user input for the filming start. For example, the user input may include a touch input to a filing start button displayed on the display 110 or a voice input for the filming start.

In step 1303, the video recording module 219 may request first video data acquisition from the camera 230.

In step 1304, the camera 230 may provide the first video data to the video recording module 219. The video recording module 219 may obtain, from the camera 230, at least one image frame among the plurality of the image frames included in the first video data. For example, the camera 230 may provide one image frame included in the first video data to the video recording module 219.

Steps 1304 through 1317 may be repeated for each image frame included in the first video data.

In step 1305, the video recording module 219 may request region of interest calculation from the region of interest calculating module 213.

In step 1306, the region of interest calculating module 213 may request a behavior pattern from the behavior pattern defining module 211. The behavior pattern stored in the behavior pattern defining module 211 may be defaulted in the electronic device, and may be changed by user's modification.

In step 1307, the behavior pattern defining module 211 may provide the behavior pattern to the region of interest calculating module 213. For example, the behavior pattern may include at least one of whether to use a submodule designated in the submodules of the region of interest calculating module 213, an object amount, which may be set to the object of interest in the image frame, or sensitivity and response speed in extracting at least one object.

The operations of the region of interest calculating module 213 requesting a behavior pattern from the behavior pattern defining module 211 and receiving the behavior pattern may be performed only once in response to a user input to start capturing video. The region of interest calculating module 213 does not receive the behavior pattern every time the video recording module 219 obtains the image frames included in the first video data from the camera 230, and steps 1306 and 1307 may be performed only once for one video capture.

In step 1308, the region of interest calculating module 213 may calculate a region of interest. The region of interest calculating module 213 may calculate the region of interest based on the behavior pattern obtained from the behavior pattern defining module 211. The region of interest calculating module 213 may set a first object of interest in the image frame included in the first video data based on the behavior pattern, and determine a first region of interest including the first object of interest.

In step 1309, the region of interest calculating module 213 may provide information of the region of interest to the key frame extracting module 215. For example, the region of interest calculating module 213 may provide at least one object information to the key frame extracting module 215.

In step 1310, the region of interest calculating module 213 may also forward the region of interest information to the video recording module 219.

In step 1311, the video recording module 219 may forward second video data to the display 110, based on the obtained region of interest information. The video recording module 219 may obtain information of the first region of interest from the region of interest calculating module 213, generate the second video data based on the first region of interest, and provide the second video data to the display 110.

In step 1312, the display 110 may display the second video data obtained from the video recording module 219. The user may receive the second video data as the preview during the video recording.

In step 1313, the key frame extracting module 215 may calculate a key frame based on the region of interest information obtained from the region of interest calculating module 213. Since the region of interest information includes the information of the at least one object included in the image frame, the key frame extracting module 215 may determine whether the at least one object is extracted from the image frame in a pre-designated manner. For example, if the object amount extracted from the image frame included in the first video data is changed, the key frame extracting module 215 may determine that a corresponding image frame is included in the key frame.

In step 1314, the key frame extracting module 215 may provide key frame information to the video recording module 219.

In step 1315, the video recording module 219 may store the first video data and the second video data in the memory 250. The video recording module 219 may store in the memory 250 at least one image frame included in the first video data, and image frames included in the second video data generated based on the image frame. The video recording module 219 may store in the memory 250 information of the at least one image frame extracted from the image frame included in the first video data and key frame information together with the first video data. The video recording module 219 may store, in the memory 250, the first object of interest information and the first region of interest information together with the first video data.

In step 1316, the key frame extracting module 215 may provide the key frame information to the display 110.

In step 1317, the display 110 may display the key frame information. For example, while obtaining the image frame included in the first video data, the processor 240 may display information that the image frame corresponds to the key frame on the display 110. The processor 240 may display an indication through a separate UI or edge lighting in the execution screen of the first application 210 on the display 110, output an audio notification through a speaker, or output a notification through an LED.

In response to receiving a user input to start recording video, the processor 240 may repeat steps 1303 to 1317.

In step 1318, the electronic device may wait to receive a user input. For example, the video recording module 219 may wait for a user input to stop recording video.

In step 1319, the video recording module 219 may receive the user input to stop recording the video.

Figure 14:
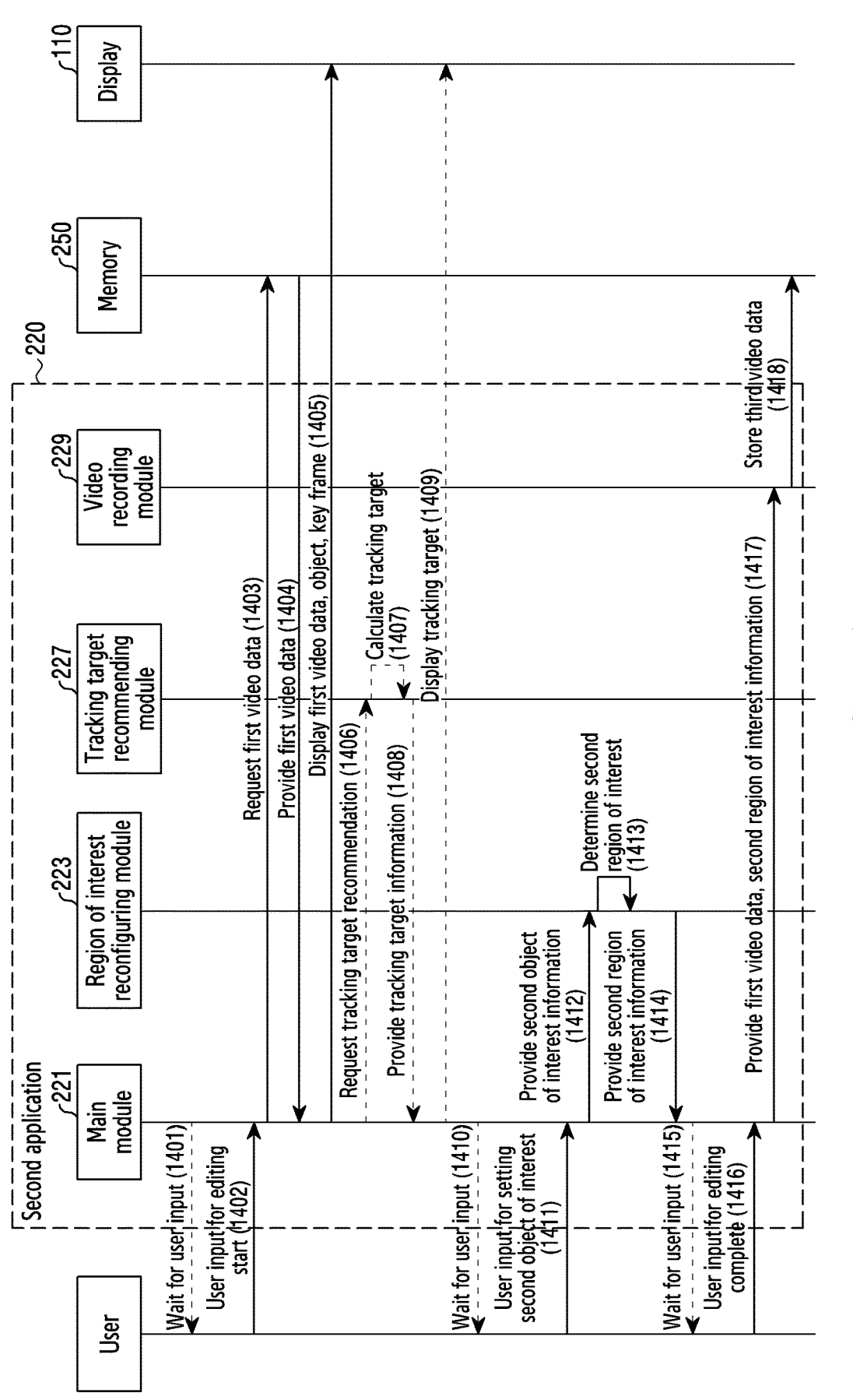
FIG. 14 is a signal flow diagram illustrating a method using a second application in an electronic device according to an embodiment.

FIG. 14 is a signal flow diagram illustrating a method using a second application in an electronic device according to an embodiment.

As described above, using the second application 220, the processor 240 may receive a user input that sets a second object of interest, which is different from a first object of interest, in a plurality of image frames included first video data, generate third video data based on at least the second object of interest from the first video data, and store the third video data in the memory 250.

Referring to FIG. 14, the electronic device may wait to receive a user input in step 1401. For example, the main module 221 may wait for a user input for editing start.

In step 1402, the main module 221 may receive the user input for the editing start. For example, the main module 221 may display a 'load video' button in an execution start screen of the second application 220 on the display 110, and receive a user's touch input to the button.

In step 1403, the main module 221 may request the first video data from the memory 250.

In step 1404, the memory 250 may provide the first video data to the main module 221. The memory 250 may provide the main module 221 with at least one information of information of at least one object extracted from the plurality of the image frames included in the first video data, key frame information, first object of interest information, or first region of interest information, together with the first video data.

In step 1405, the main module 221 may display the first video data, the at least one object information, and the key frame information on the display 110. For example, the main module 221 may display the at least one object information in a rectangular form on the display 110, and display the key frame information through a key frame indication positioned inside a progress bar on the display 110. The main module 221 may display the first region of interest information on the display 110. The main module 221 may display a region included in the first region of interest and a region not included in the first region of interest to distinguish them through lines or shade.

In step 1406, the main module 221 may request tracking target recommendation from the tracking target recommending module 227.

In step 1407, the tracking target recommending module 227 may calculate a tracking target. For example, the tracking target recommending module 227 may extract at least one object from the plurality of the image frames included in the first video data. The at least one object extracted at the tracking target recommending module 227 may be different from the at least one object extracted through the first application 210.

In step 1408, the tracking target recommending module 227 may provide tracking target information to the main module 221. Based on the object newly extracted according to calculating the tracking target at the tracking target recommending module 227, the region of interest reconfiguring module 223 may calculate an image frame corresponding to the key frame, update the key frame information, and provide the updated key frame information to the main module 221.

In step 1409, the main module 221 may display the tracking target on the display 110.

Upon determining that the at least one object information extracted in the first application 210 and obtained from the memory 250 together with the first video data is not sufficient or not appropriate, the main module 221 may request the tracking target recommendation from the tracking target recommending module 227 and newly extract at least one object included in the image frame.

Upon determining that the at least one object information extracted in the first application 210 and obtained from the memory 250 together with the first video data is sufficient, the main module 221 may omit steps 1406 through 1409.

In step 1410, the electronic device 100 may wait to receive a user input. For example, the main module 221 may wait for a user input that sets a second object of interest.

In step 1411, the main module 221 may receive the user input that identifies the second object of interest. The main module 221 may wait for the user input that sets the second object of interest different from the first object of interest. The main module 221 may receive a user input for modifying the position or the size of the region of interest, or a user input for adding, removing, or moving the key frame, instead of receiving a user input for setting the second object of interest different from the object of interest.

In step 1411, the main module 221 may receive a user input that sets the second object of interest in the image frame corresponding to the key frame. The user may set the second object of interest in the image frame corresponding to the key frame among the plurality of the image frames included in the first video data.

In step 1412, the main module 221 may provide information of the second object of interest to the region of interest reconfiguring module 223. The main module 221 may provide the region of interest reconfiguring module 223 with information of the modified region of interest, or information of the modified key frame.

In step 1413, the region of interest reconfiguring module 223 may determine a second region of interest. The region of interest reconfiguring module 223 may determine the second region of interest including at least the second object of interest based on the second object of interest information obtained from the main module 221.

In response to a user input that determines the second object of interest in the image frame corresponding to the key frame, the region of interest reconfiguring module 223 may determine the second region of interest in the image frame corresponding to the key frame, and determine the second region of interest also in the image frame not corresponding to the key frame.

In step 1414, the region of interest reconfiguring module 223 may provide information of the second region of interest to the main module 221.

In step 1415, the electronic device may wait to receive a user input, e.g., a user input indicating editing completion.

In step 1416, the main module 221 may receive the user input indicating the editing is completed.

In step 1417, the main module 221 may provide the video recording module 229 with the first video data and the second region of interest information. The main module 221 may provide the video recording module 229 with the modified key frame information.

In step 1418, the video recording module 229 may store third video data in the memory 250. The video recording module 229 may generate the third video data based on the obtained first video data and the second region of interest, and store the third video data in the memory 250.

Figure 15:
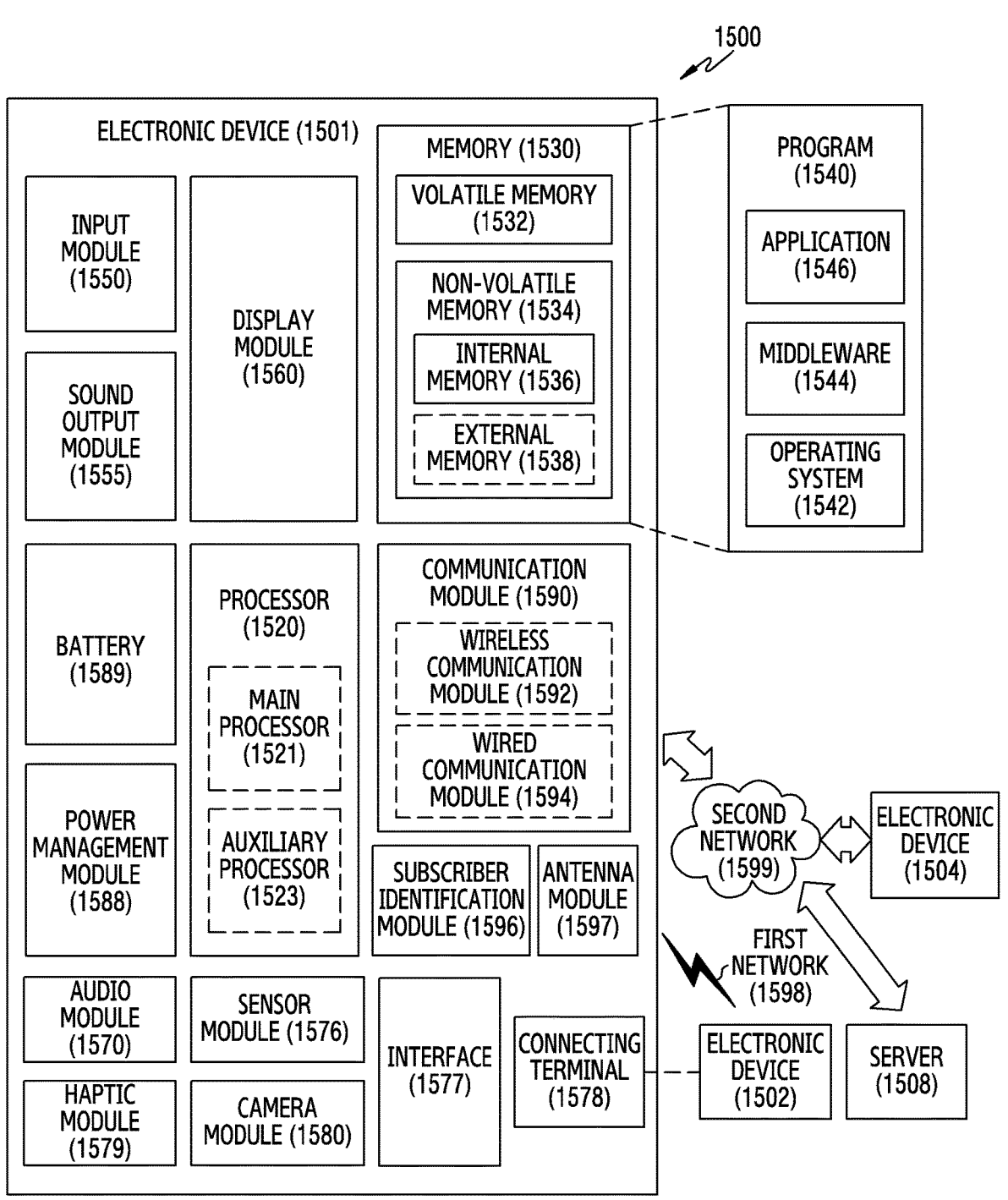
FIG. 15 illustrates an electronic device in a network environment, according to an embodiment.

FIG. 15 illustrates an electronic device 1501 in a network environment 1500 according to an embodiment.

Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). The electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an AP), or an auxiliary processor 1523 (e.g., a graphics processing unit (GPU), a neural processing unit (NPU), an ISP, a sensor hub processor, or a CP) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). The auxiliary processor 1523 (e.g., an ISP or a CP) may be implemented as part of another component (e.g., the camera module 1580 or the communication module 1590) functionally related to the auxiliary processor 1523. According to an embodiment, the auxiliary processor 1523 (e.g., the NPU) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. The receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. The display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device 1502 directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 1577 may support one or more specified protocols to be used for the electronic device 1501 to be coupled with the external electronic device 1502 directly (e.g., wiredly) or wirelessly. The interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. The haptic module 1579 may include, for example, a motor, a piezoelectric element, or an electric stimulator.

The camera module 1580 may capture a still image or moving images. The camera module 1580 may include one or more lenses, image sensors, ISPs, or flashes.

The power management module 1588 may manage power supplied to the electronic device 1501. The power management module 1588 may be implemented as at least part of, for example, a power management integrated circuit (PMIC).

The battery 1589 may supply power to at least one component of the electronic device 1501. The battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more CPs that are operable independently from the processor 1520 (e.g., the AP) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or IR data association (IrDA)) or the second network 1599 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the SIM 1596.

The wireless communication module 1592 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. The antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency IC (RFIC)) other than the radiating element may be additionally formed as part of the antenna module 1597.

According to various embodiments, the antenna module 1597 may form a mmWave antenna module. The mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or MEC. In another embodiment, the external electronic device 1504 may include an Internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific IC (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 16:
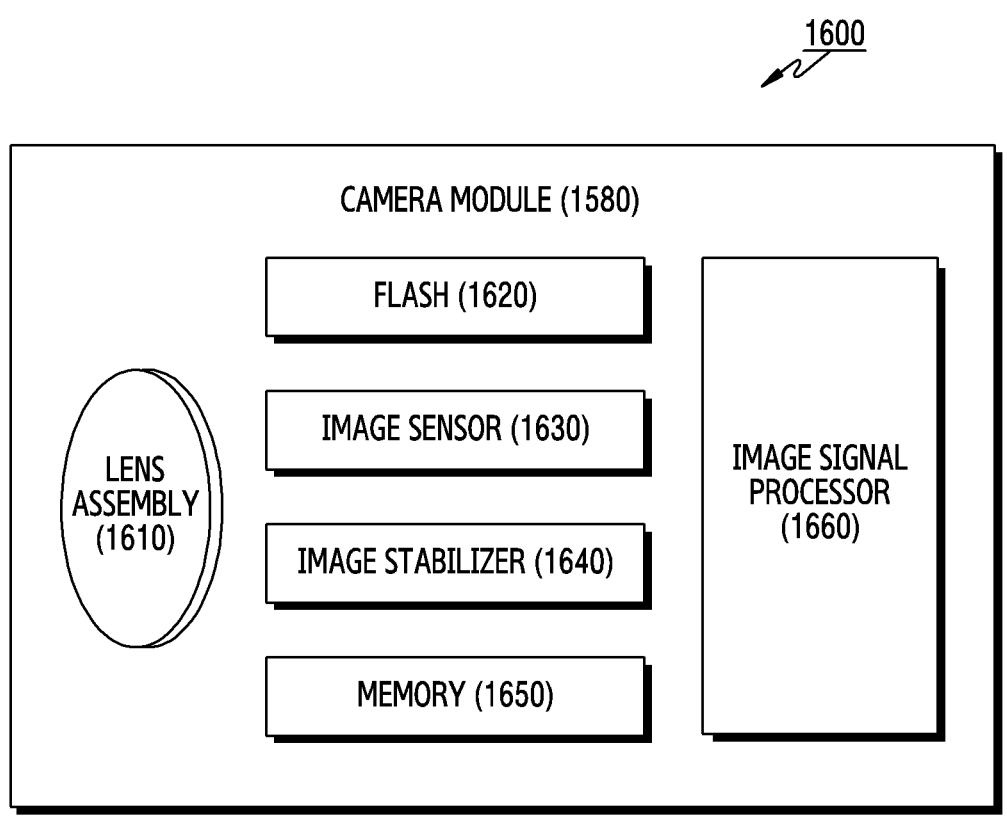
FIG. 16 illustrates a camera module, according to an embodiment.

FIG. 16 is a block diagram 1600 illustrating the camera module 1580 according to an embodiment.

Referring to FIG. 16, the camera module 1580 includes a lens assembly 1610, a flash 1620, an image sensor 1630, an image stabilizer 1640, memory 1650 (e.g., buffer memory), and an ISP 1660. The lens assembly 1610 may collect light emitted or reflected from an object whose image is to be taken. The lens assembly 1610 may include one or more lenses. The camera module 1580 may include a plurality of lens assemblies 1610. In such a case, the camera module 1580 may form a dual camera, a 360-degree camera, or a spherical camera. Some of the plurality of lens assemblies 1610 may have the same lens attribute (e.g., view angle, focal length, AF, f number, or optical zoom), or at least one lens assembly may have one or more lens attributes different from those of another lens assembly. The lens assembly 1610 may include a wide-angle lens or a telephoto lens.

The flash 1620 may emit light that is used to reinforce light reflected from an object. The flash 1620 may include one or more LEDs (e.g., a red-green-blue (RGB) LED, a white LED, an IR LED, or an ultraviolet (UV) LED) or a xenon lamp. The image sensor 1630 may obtain an image corresponding to an object by converting light emitted or reflected from the object and transmitted via the lens assembly 1610 into an electrical signal. The image sensor 1630 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1630 may be implemented using a charged coupled device (CCD) sensor or a complementary metal oxide semiconductor (CMOS) sensor.

The image stabilizer 1640 may move the image sensor 1630 or at least one lens included in the lens assembly 1610 in a particular direction, or control an operational attribute (e.g., adjust the read-out timing) of the image sensor 1630 in response to the movement of the camera module 1580 or an electronic device including the camera module 1580. This allows compensating for at least part of a negative effect (e.g., image blurring) by the movement on an image being captured.

The image stabilizer 1640 may sense such a movement by the camera module 1580 or the electronic device using a gyro sensor or an acceleration sensor disposed inside or outside the camera module 1580. The image stabilizer 1640 may be implemented as an optical image stabilizer.

The memory 1650 may store, at least temporarily, at least part of an image obtained via the image sensor 1630 for a subsequent image processing task. For example, if image capturing is delayed due to shutter lag or multiple images are quickly captured, a raw image obtained (e.g., a Bayer-patterned image, a high-resolution image) may be stored in the memory 1650, and its corresponding copy image (e.g., a low-resolution image) may be previewed via a display device. Thereafter, if a specified condition is met (e.g., by a user's input or system command), at least part of the raw image stored in the memory 1650 may be obtained and processed, for example, by the ISP 1660. The memory 1650 may be configured as at least part of a memory of the electronic device or as a separate memory that is operated independently from the memory of the electronic device.

The ISP 1660 may perform one or more image processing with respect to an image obtained via the image sensor 1630 or an image stored in the memory 1650. The one or more image processing may include, for example, depth map generation, 3D modeling, panorama generation, feature point extraction, image synthesizing, or image compensation (e.g., noise reduction, resolution adjustment, brightness adjustment, blurring, sharpening, or softening). Additionally or alternatively, the ISP 1660 may perform control (e.g., exposure time control or read-out timing control) with respect to at least one (e.g., the image sensor 1630) of the components included in the camera module 1580. An image processed by the ISP 1660 may be stored back in the memory 1650 for further processing, or may be provided to an external component outside the camera module 1580. The ISP 1660 may be configured as at least part of a processor of the electronic device, or as a separate processor that is operated independently from the processor of the electronic device. If the ISP 1660 is configured as a separate processor from the processor of the electronic device, at least one image processed by the ISP 1660 may be displayed, by the processor of the electronic device, via the display device as it is or after being further processed.

According to an embodiment, an electronic device may include a plurality of camera modules having different attributes or functions. At least one of the plurality of camera modules may form a wide-angle camera and at least another of the plurality of camera modules may form a telephoto camera. Similarly, at least one of the plurality of camera modules may form a front camera and at least another of the plurality of camera modules may form a rear camera.

An electronic device according to an embodiment may include a camera, a memory, and a processor. The processor may obtain first video data through the camera, while obtaining the first video data, set a first object of interest in a plurality of image frames included in the first video data, store second video data generated based on the first object of interest from the first video data in the memory, after generating the second video data, receive a user input which sets a second object of interest different from the first object of interest in the plurality of the image frames included in the first video data, and in response to receiving the user input, store third video data generated based on at least the second object of interest from the first video data in the memory.

The processor may, while obtaining the first video data, extract at least one object from the plurality of the image frames included in the first video data, set the first object of interest in the extracted at least one object, determine a first region of interest including the first object of interest in the plurality of the image frames, and generate the second video data based on the first region of interest.

The processor may store information of the at least one object together with the first video data in the memory.

The processor may receive the user input for setting the second object of interest among the at least one object, determine a second region of interest including at least the second object of interest in the plurality of the image frames, and generate the third video data based on the second region of interest.

The at least one processor may, while obtaining the first video data, obtain key frame information corresponding to an image frame in which the at least one object is extracted in a pre-designated manner from the plurality of the image frames included in the first video data, and store the key frame information together with the first video data in the memory.

The processor may receive the user input for setting the second object of interest in an image frame corresponding to the key frame among the plurality of the image frames included in the first video data, and in response to receiving the user input, generate the third video data.

The electronic device may include a display electrically connected with the processor. The processor may, before obtaining the first video data, obtain an image including the at least one object through the camera, display the image on the display, and receive the user input for setting the first object of interest among the at least one object included in the image.

The electronic device may include a display electrically connected with the processor. The processor may, while obtaining the first video data, display the second video data as a preview on the display.

An operating method of an electronic device according to an embodiment may include obtaining first video data through a camera included in the electronic device, while the obtaining first video data, setting a first object of interest in a plurality of image frames included in the first video data, storing second video data generated based on the first object of interest from the first video data in a memory included in the electronic device, after generating the second video data, receiving a user input which sets a second object of interest different from the first object of interest in the plurality of the image frames included in the first video data, and in response to receiving the user input, storing third video data generated based on at least the second object of interest from the first video data in the memory.

The operating method of the electronic device may include while obtaining the first video data, extracting at least one object from the plurality of the image frames included in the first video data, setting the first object of interest in the extracted at least one object, and determining a first region of interest including the first object of interest in the plurality of the image frames, and generating the second video data based on the first region of interest.

The operating method of the electronic device may include storing information of the at least one object together with the first video data in the memory.

The operating method of the electronic device may include receiving the user input for setting the second object of interest among the at least one object, determining a second region of interest including at least the second object of interest in the plurality of the image frames, and generating the third video data based on the second region of interest.

The operating method of the electronic device may include, while obtaining the first video data, obtaining key frame information corresponding to an image frame in which the at least one object is extracted in a pre-designated manner from the plurality of the image frames included in the first video data, and storing the key frame information together with the first video data in the memory.

The operating method of the electronic device may include receiving the user input for setting the second object of interest in an image frame corresponding to the key frame among the plurality of the image frames included in the first video data, and in response to receiving the user input, generating the third video data.

The operating method of the electronic device may include, before obtaining the first video data, obtaining an image including at least one object through the camera, displaying the image on a display included in the electronic device, and receiving the user input for setting the first object of interest among the at least one object included in the image.

An electronic device according to an embodiment may include a camera, a memory, and a processor. The processor may, using a first application, obtain first video data through the camera, sets a first object of interest in a plurality of image frames included in the first video data, and stores second video data generated based on the first object of interest from the first video data in the memory second, and using a second application, receive a user input which sets a second object of interest different from the first object of interest in the plurality of the image frames included in the first video data, and stores third video data generated based on at least the second object of interest from the first video data in the memory.

The processor may, using the first application, while obtaining the first video data, extract at least one object from the plurality of the image frames included in the first video data, obtain key frame information corresponding to an image frame in which the at least one object is extracted in a pre-designated manner from the plurality of the image frames, and stores information of the at least one object and the key frame information together with the first video data in the memory.

The processor may, using the second application, generate the third video data different from the second video data through the first video data, the at least one object information, and the key frame information.

The processor may, using the second application, receive the user input for setting at least a part of the at least one object to the second object of interest, in an image frame corresponding to the key frame among the plurality of the image frames included in the first video data, in response to receiving the user input, determine a region of interest including at least the second object of interest in the image frame corresponding to the key frame, and generate the third video data based on the region of interest.

The processor may, using the second application, in response to receiving the user input, calculate the region of interest in an image frame not corresponding to the key frame among the plurality of the image frames included in the first video data, and generate the third video data based on the region of interest.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:
1. An electronic device, comprising:
a camera;
a display;
at least one processor; and
memory storing instructions, being executable by the at least one processor, that cause the electronic device:
obtain first video data through the camera,
while obtaining the first video data, determine a first object of interest in a plurality of image frames included in the first video data,
determine a first region of interest including the first object of interest in the plurality of image frames,
store, in the memory, second video data generated by cropping and enlarging the first region of interest within the first video data, and region of interest information of the first region of interest,

based on the stored region of interest information, display, on the display, an image frame of the plurality of image frames with region of interest information within the image frame,
based on the displayed image frame with the region of interest information within the image frame, receive a user input to select a second object of interest, different from the first object of interest, in the plurality of the image frames included in the first video data, and
in response to receiving the user input, store, in the memory, third video data generated by cropping and enlarging, within the first video data, a second region of interest including the second object of interest in the plurality of image frames,
wherein the first video data, the second video data and the third video data have identical frame sizes.
2. The electronic device of claim 1, wherein the instructions further cause the electronic device to:
while obtaining the first video data, extract at least one object from the plurality of the image frames included in the first video data, and
determine the first object of interest in the extracted at least one object.
3. The electronic device of claim 2, wherein the instructions further cause the electronic device to store, in the memory, information of the at least one object with the first video data.
4. The electronic device of claim 3, wherein the second object of interest is selected from among the at least one object.
5. The electronic device of claim 3, wherein the instructions further cause the electronic device to:
while obtaining the first video data, obtain key frame information corresponding to the image frame in which the at least one object is extracted in a pre-designated manner from the plurality of the image frames included in the first video data, and
store, in the memory, the key frame information with the first video data.
6. The electronic device of claim 5, wherein the second object of interest in the image frame corresponding to the key frame information, among the plurality of the image frames included in the first video data, and
wherein the instructions further cause the electronic device to:
in response to receiving the user input, generate the third video data.
7. The electronic device of claim 1, wherein the instructions further cause the electronic device to:
before obtaining the first video data, obtain an image including the at least one object through the camera,
display the image on the display, and
receive a user input for determining the first object of interest among the at least one object included in the image.
8. The electronic device of claim 1, wherein the instructions further cause the electronic device to, while obtaining the first video data, display the second video data as a preview on the display.
9. A method performed by an electronic device, the method comprising:
obtaining first video data through a camera included in the electronic device;
while the obtaining first video data, setting a first object of interest in a plurality of image frames included in the first video data;

determining a first region of interest including the first object of interest in the plurality of image frames;

storing, in a memory included in the electronic device, second video data generated by cropping and enlarging the first region of interest within the first video data, and region of interest information of the first region of interest;

based on the stored region of interest information, displaying, on a display, an image frame of the plurality of image frames with region of interest information within the image frame, based on the displayed image frame with the region of interest information within the image frame, receiving a user input for determining a second object of interest, which is different from the first object of interest, in the plurality of the image frames included in the first video data; and in response to receiving the user input, storing, in the memory, third video data generated by cropping and enlarging, within the first video data a second region of interest including at least the second object of interest in the plurality of image frames, wherein the first video data, the second video data and the third video data have identical frame sizes.

10. The method of claim 9, further comprising:

while obtaining the first video data, extracting at least one object from the plurality of the image frames included in the first video data; and setting the first object of interest in the extracted at least one object.

11. The method of claim 10, further comprising storing, in the memory, information of the at least one object with the first video data.

12. The method of claim 11, further comprising:

receiving the user input for determining the second object of interest among the at least one object;

determining the second region of interest including at least the second object of interest in the plurality of the image frames; and generating the third video data based on the second region of interest.

13. The method of claim 11, further comprising:

while obtaining the first video data, obtaining key frame information corresponding to the image frame in which the at least one object is extracted in a pre-designated manner from the plurality of the image frames included in the first video data; and storing, in the memory, the key frame information together with the first video data.

14. The method of claim 13, wherein the second object of interest in the image frame corresponds to the key frame information, among the plurality of the image frames included in the first video data; and wherein the method further comprises:

in response to receiving the user input, generating the third video data.

15. The method of claim 9, further comprising:

before obtaining the first video data, obtaining, through the camera, an image including at least one object;

displaying the image on a display included in the electronic device; and receiving the user input for setting the first object of interest among the at least one object included in the image.

16. An electronic device, comprising:

a camera;

a display;

at least one processor; and memory storing instructions, being executable by the at least one processor, the cause the electronic device:

using a first application, obtain first video data through the camera, determine a first object of interest in a plurality of image frames included in the first video data, determine a first region of interest including the first object of interest in the plurality of image frames, and store, in the memory, second video data generated by cropping and enlarging the first region of interest within the first video data, and region of interest information of the first region of interest, and using a second application, based on the stored region of interest information, display, on the display, an image frame of the plurality of image frames with region of interest information within the image frame, based on the displayed image frame with the region of interest information within the image frame, receive a user input to select a second object of interest, which is different from the first object of interest, in the plurality of the image frames included in the first video data, and store, in the memory, third video data generated from the first video data by cropping and enlarging, within the first video data, a second region of interest including the second object of interest in the plurality of image frames, wherein the first video data, the second video data.

17. The electronic device of claim 16, wherein the first application further causes the electronic device to:

while obtaining the first video data, extract at least one object from the plurality of the image frames included in the first video data, obtain key frame information corresponding to the image frame in which the at least one object is extracted in a pre-designated manner from the plurality of the image frames, and store, in the memory, information of the at least one object and the key frame information together with the first video data.

18. The electronic device of claim 17, wherein the second application further causes the electronic device to generate the third video data, which is different from the second video data, through the first video data, the at least one object information, and the key frame information.

19. The electronic device of claim 18, wherein the second object of interest corresponds to at least a part of the at least one object, in the image frame corresponding to the key frame information, among the plurality of the image frames included in the first video data, and wherein the second application further causes the electronic device to:

in response to receiving the user input, determine the second region of interest including at least the second object of interest in the image frame corresponding to the key frame, and generate the third video data based on the determined second region of interest.

20. The electronic device of claim 19, wherein the second application further causes the electronic device to:

in response to receiving the user input, calculate the second region of interest in an image frame not corresponding to the key frame information, among the plurality of the image frames included in the first video data, and generate the third video data based on the calculated second region of interest.

* * * * *